(12) United States Patent  (10) Patent No.: US 7,669,342 B1
Crain et al.  (45) Date of Patent: Mar. 2, 2010

(54) LEVEL FOR A GEOMATICS TARGET DEVICE

(75) Inventors: Stephen B. Crain, Cape Girardeau, MO (US); Clinton J. Mize, Jonesboro, IL (US); Lindsey Marie Davis, Cape Girardeau, MO (US)

(73) Assignee: SECO Manufacturing Company, Inc., Sunnyvale, CA (US)

( * ) Notice: Subject to any disclaimer, the term of this patent is extended or adjusted under 35 U.S.C. 154(b) by 86 days.

(21) Appl. No.: 11/952,179

(22) Filed: Dec. 7, 2007

(51) Int. Cl.
G01C 9/28 (2006.01)
G01C 15/08 (2006.01)

(52) U.S. Cl. .................. 33/372; 33/295; 248/316.6; 248/231.81

(58) Field of Classification Search .............. 33/290, 33/293, 295, 347, 370–377, 379, 769, 770, 33/495–500; 248/228.1, 230.5, 231.61, 291.1, 248/316.6, 316.5, 218.4, 230, 289.11, 122.1, 248/125.1, 219.4, 227.3, 231.81, 228.5, 230.1, 248/230.4, 542; 403/94, 96, 161–163, 326
See application file for complete search history.

(56) References Cited

U.S. PATENT DOCUMENTS

| | | | |
|---|---|---|---|
| 2,096,638 A | 10/1937 | Higgins, Jr. | |
| 3,057,250 A | 10/1962 | Griffith | |
| 3,296,708 A * | 1/1967 | Moody | 33/371 |
| 3,570,130 A * | 3/1971 | Boehm | 33/295 |
| 3,685,162 A * | 8/1972 | Haun | 33/295 |
| 4,290,207 A | 9/1981 | Browning | |
| 5,255,441 A | 10/1993 | Burgess | |
| 5,442,864 A * | 8/1995 | Erman | 33/376 |
| 5,459,934 A | 10/1995 | Heroux | |
| 5,701,679 A | 12/1997 | Buzikievich | |
| 5,791,609 A | 8/1998 | Hankins | |
| 6,029,359 A * | 2/2000 | Szumer | 33/373 |
| 6,640,456 B2 * | 11/2003 | Owoc et al. | 33/382 |
| 6,684,580 B1 * | 2/2004 | Hull | 52/170 |
| 6,772,526 B1 | 8/2004 | Crain | |
| 6,874,239 B1 | 4/2005 | White | |
| 7,059,059 B1 * | 6/2006 | Ames | 33/372 |
| D579,803 S * | 11/2008 | Crain et al. | D10/69 |
| 2003/0204966 A1 * | 11/2003 | Hsu | 33/769 |

\* cited by examiner

*Primary Examiner*—Amy Cohen Johnson
(74) *Attorney, Agent, or Firm*—Senniger Powers LLP

(57) ABSTRACT

A snap-on support has a body and a pair of spaced-apart arms supported by the body and adapted for snap-fit connection with a geomatics target device. The arms are moveable between an operative position wherein the arms extend outward from the body for securing the support to the geomatics target device and a stowed position wherein the arms are retracted generally adjacent to the body for storage of the support.

25 Claims, 26 Drawing Sheets

LEVEL FOR A GEOMATICS TARGET DEVICE

FIELD OF THE INVENTION

The present invention generally relates to levels and more particularly to a level for attaching to a survey rod.

BACKGROUND

During a typical land survey, multiple and various measurements are often taken. For example, measurements of property boundaries and measurements of other locations (e.g., the position of fire hydrants) may be performed in the same survey using the same geomatics target device (e.g., a survey rod, a prism pole). During the survey, the geomatics target device is moved between each location from where measurements are to be taken. For some measurements, the geomatics target device may be handheld in vertical collimation over the location. Positioning the geomatics target device by hand provides a fast and convenient method of taking measurements. However, for the measurement to be accurate, the geomatics target device must be vertically collimated before the measurement can be taken.

A level with a bubble vial is commonly supported at a point along the length of the geomatics target device to facilitate vertical collimation of the device over the location in a process known as plumbing. One known type of level is held against the geomatics target device by the surveyor using the same hand that is used to support the geomatics target device. This type of level must be carried by the surveyor to each of the survey locations independently of the geomatics target device. Since surveyors typically carry numerous items (e.g., a radio, survey stakes or other markers, a hammer, a chisel), the handheld levels can be easily misplaced.

Another known type of level has a snap-fit with the geomatics target device. This type of level can be selectively secured and removed from the geomatics target device. As a result, the level and geomatics target device can be carried to each location as a single unit thereby lessening the potential of misplacing the level. However, arms of the level make the level somewhat difficult to store in that they extend outward from a body of the level making the size of the level too large to fit into some pockets. In addition, the arms protrude from the rest of the level thereby making them susceptible to breakage when the level is not in use. Moreover, the configuration of the engagement surface (i.e., the surface that contacts the geomatics target device) of these levels does not substantially conform to the shape of the geomatics target device to which they are attached. As a result, the level can potentially be canted with respect to the geomatics target device thereby compromising the accuracy of the measurement. Canting of the level may result in the geomatics target device not being vertically collimated when the measurement is taken and thereby result in inaccurate measurements.

SUMMARY

In one aspect, a snap-on support for attachment to a geomatics target device generally comprises a body, and a pair of spaced-apart arms supported by the body and adapted for snap-fit connection with the geomatics target device. The arms are moveable between an operative position wherein the arms extend outward from the body for securing the support to the geomatics target device and a stowed position wherein the arms are retracted generally adjacent to the body for storage of the support.

In another aspect, a level for a geomatics target device generally comprises a body, a level vial secured to the body, and a pair of spaced-apart arms supported by the body and adapted for releasable, snap-fit connection with the geomatics target device. At least one of the arms is pivotable about an axis between a stowed position generally adjacent to the body and an extended position projecting outwardly from the body.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE DRAWINGS

Figure 1:
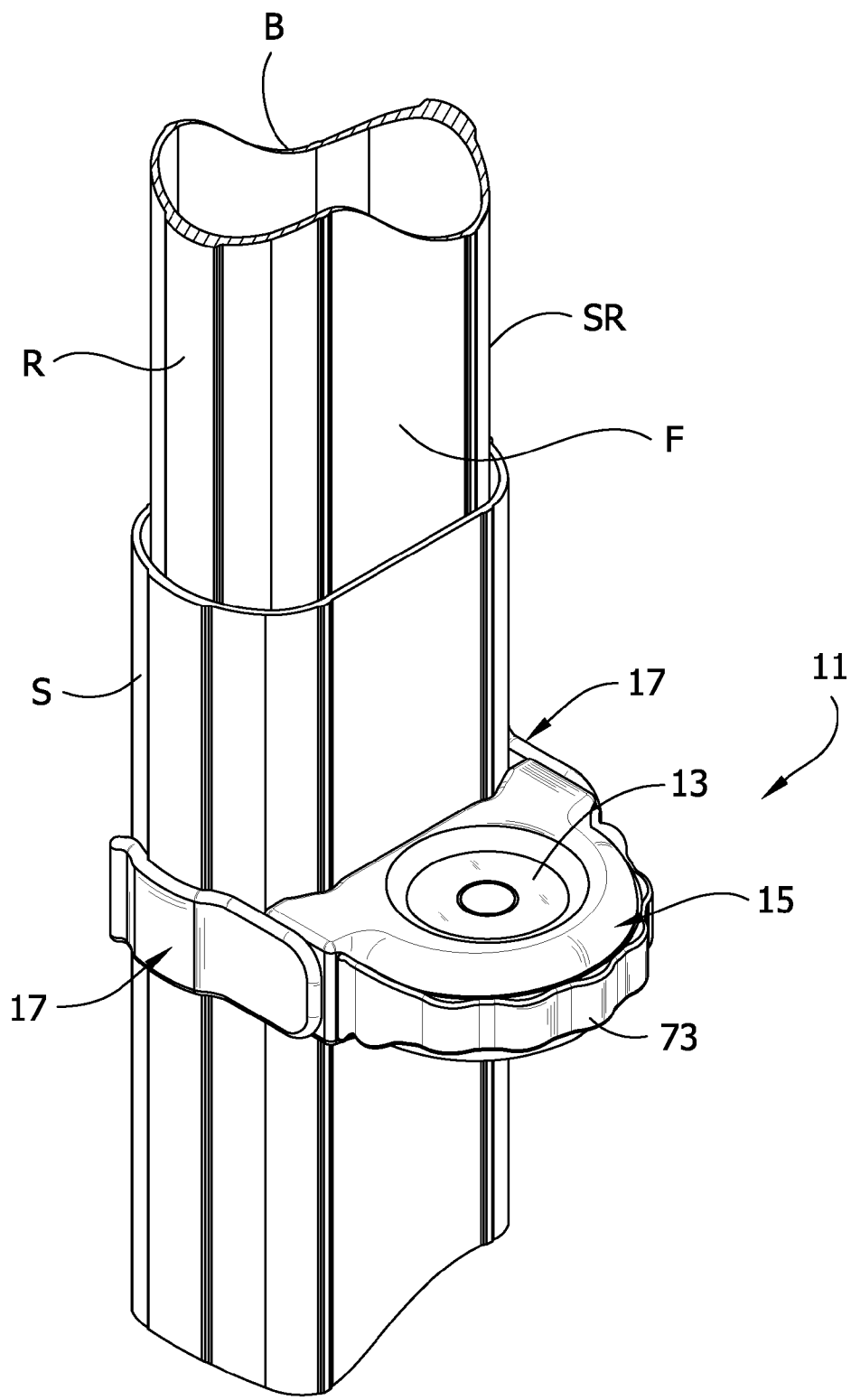
FIG. 1 is a perspective view of a level of a first configuration attached to a survey rod, only a fragmentary portion of the survey rod being shown.

With reference to FIG. 1, a level, generally indicated at 11, is shown attached to a survey rod SR (broadly, a "geomatics target device"). As is known in the art, survey rods SR can be used to take measurements of locations (e.g., ground points) during a survey, such as a survey of land. In order for the measurements to be accurate, the survey rod SR must be vertically collimated before the measurement is taken. The level 11 of the present invention attaches to and facilitates the vertical collimation of the survey rod SR. It is understood that the level 11 could be adapted to attach to other types of geomatic target devices (e.g., a prism pole). Moreover, a support capable of holding items other than a level vial does not depart from the scope of the present invention.

The illustrated survey rod SR is shaped so that it is easily grasped and held in a hand of a user. Specifically, the survey rod SR has a front F, a back B, and arcuate sides S (only one side being shown in FIG. 1) extending between and connecting the front and back. A rib R extends outward from each of the arcuate sides S and along the length of the survey rod SR. The front F and back B of the survey rod SR are generally flat and adapted to carry a scale (not shown) for allowing measurements to be taken using the survey rod. The illustrated survey rod SR includes a pair of generally tubular telescoping sections but it is understood that the survey rod may have more or fewer sections. It is also understood that the survey rod SR can have a different shape (e.g. circular, square, rectangular).

Figure 2:
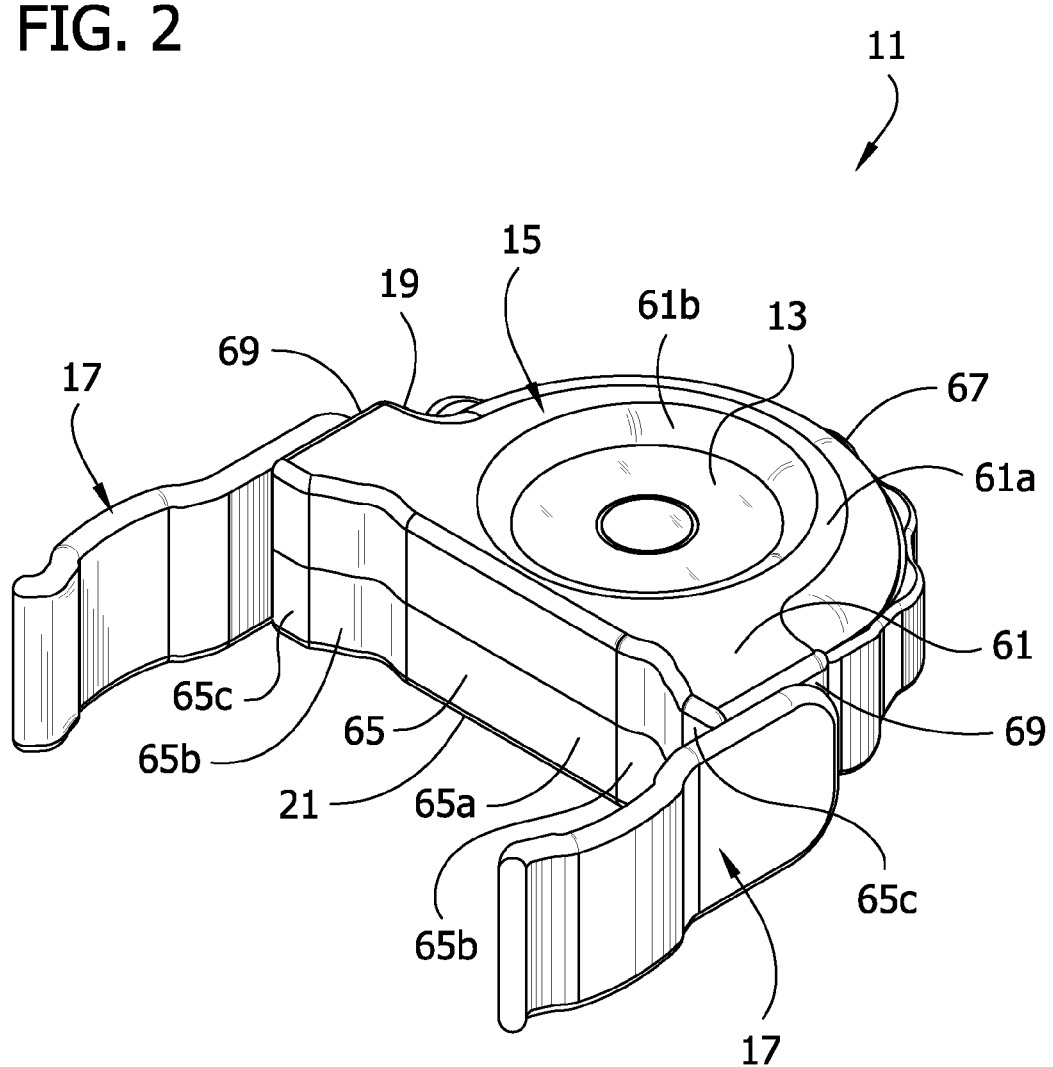
FIG. 2 is a top side perspective view of the level removed from the survey rod and with arms of the level in an operative position.
Figure 3:
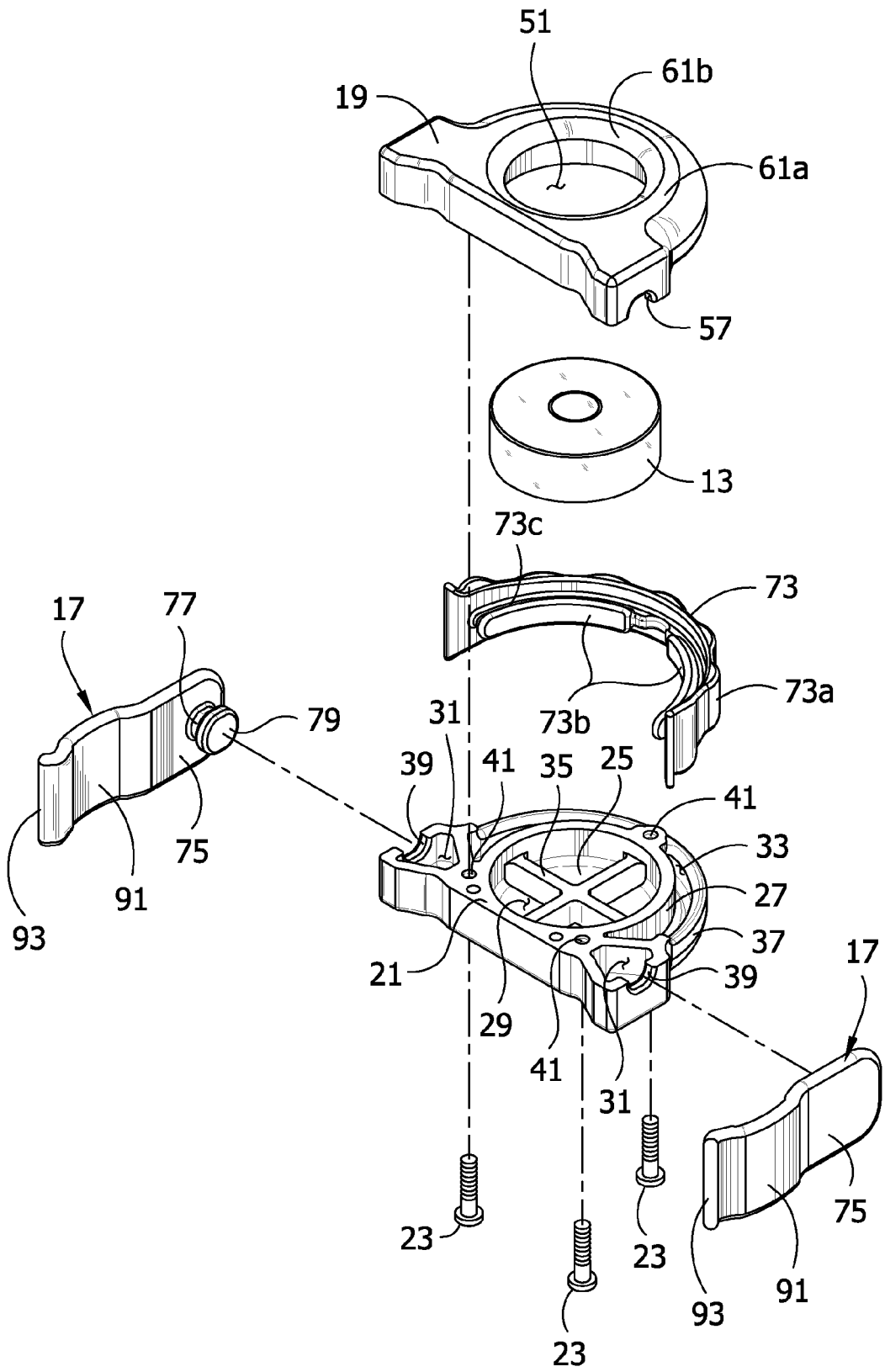
FIG. 3 is an exploded top side perspective view thereof.

Referring to FIGS. 2-6, the level 11 comprises a bubble vial 13 (broadly, a "level indicator"), a body, generally indicated at 15, capturing the vial, and a pair of spaced-apart arms, each being generally indicated at 17, extending outward from the body. The body 15 comprises an upper housing member 19 and a lower housing member 21 connectable to the upper housing member (FIG. 3). In the illustrated embodiment, the upper and lower housing members 19, 21 are formed separate and secured together using fasteners 23 (e.g., screws). It is contemplated that the body 15 of the level 11 could be formed as a single-piece or more than the two pieces illustrated herein. It is also contemplated that the upper and lower housing members 19, 21 can be secured together in other ways (e.g., bonding).

As illustrated in FIG. 3, the lower housing member 21 includes a base 25 and a framework 27 extending upward from the base. The framework 27 defines a circular recess 29, two half frustoconical recesses 31, and an arcuate channel 33. The framework 27 includes a cruciform support 35 disposed within the circular recess 29. The portion of the framework 27 adjacent the arcuate channel 33 and defining a back exterior wall 37 of the lower housing member 21 is shorter than the other peripheral portions of the framework. Cutouts 39 are located in the framework 27 adjacent each of the frustoconical recesses 39. Each of the cutouts 39 includes a flat portion and curved portions next to each side of the flat portion. The framework 27 also includes three holes 41 for allowing the fasteners 23 to pass through the lower housing member 21 as described in further detail below.

Figure 5:
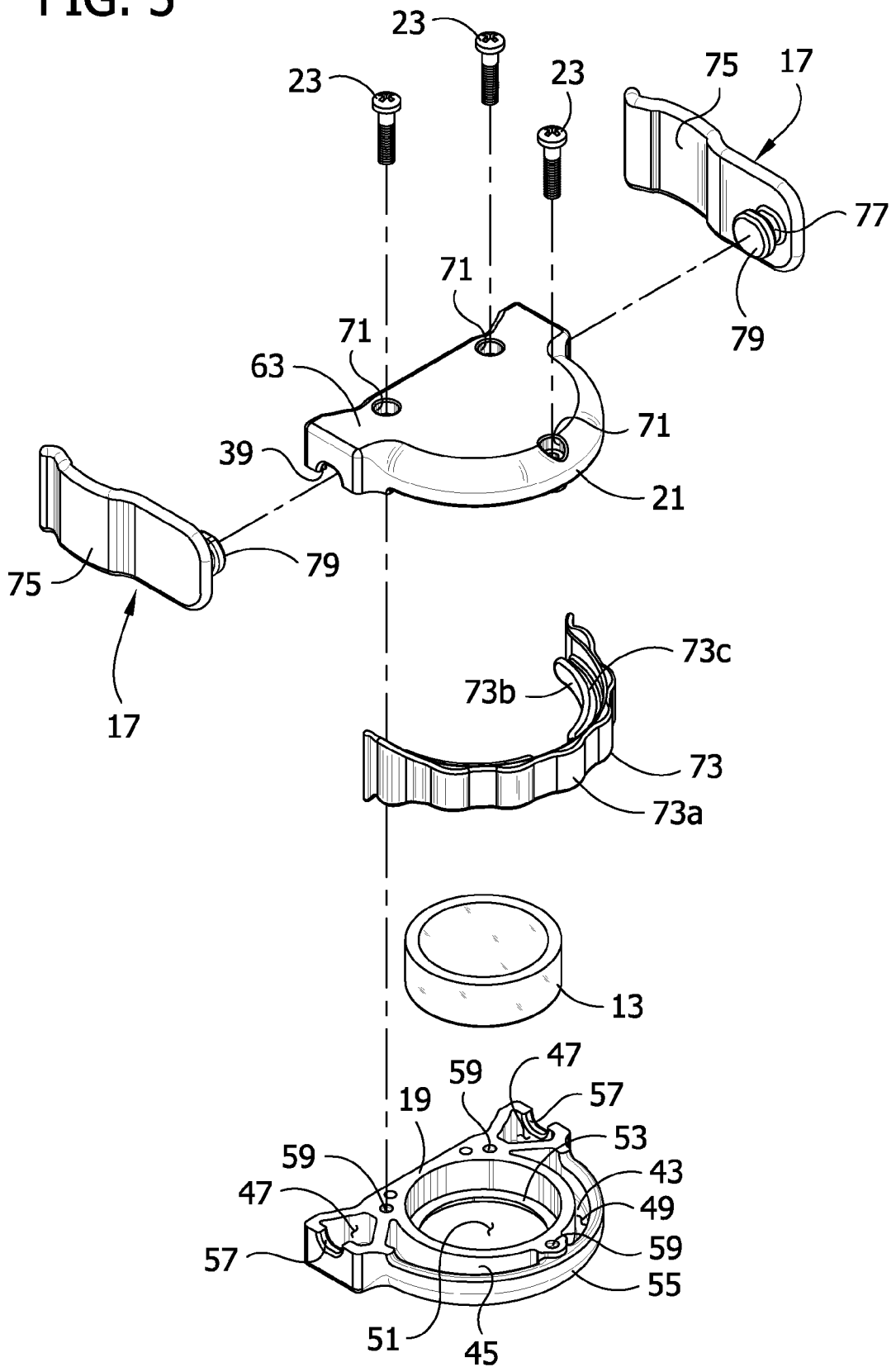
FIG. 5 is an exploded bottom side perspective view thereof.

With reference now to FIG. 5, the upper housing member 19, which is similar to the lower housing member 21, also comprises a base 43 and a framework 45 extending upward from the base. Like the lower housing member 21, the framework 45 of the upper housing member 19 defines two half frustoconical recesses 47 and an arcuate channel 49. In the upper housing member 19, however, an opening 51 is formed in the base 43. A flange 53 extends inward from the framework 45 at the top of the opening 51 and surrounds the periphery of the opening. The portion of the framework 45 adjacent the arcuate channel 49 and defining a back exterior wall of 55 the upper housing member 19 is shorter than the other portions of the framework. Cutouts 57 are located in the framework 45 adjacent each of the half frustoconical recesses 47. Each of the cutouts 57 includes a flat portion and curved portions next to each side of the flat portion. The framework 45 also includes three openings 59 for receiving the fasteners 23 used to secure the lower housing member 21 to the upper housing member 19.

Figure 4:
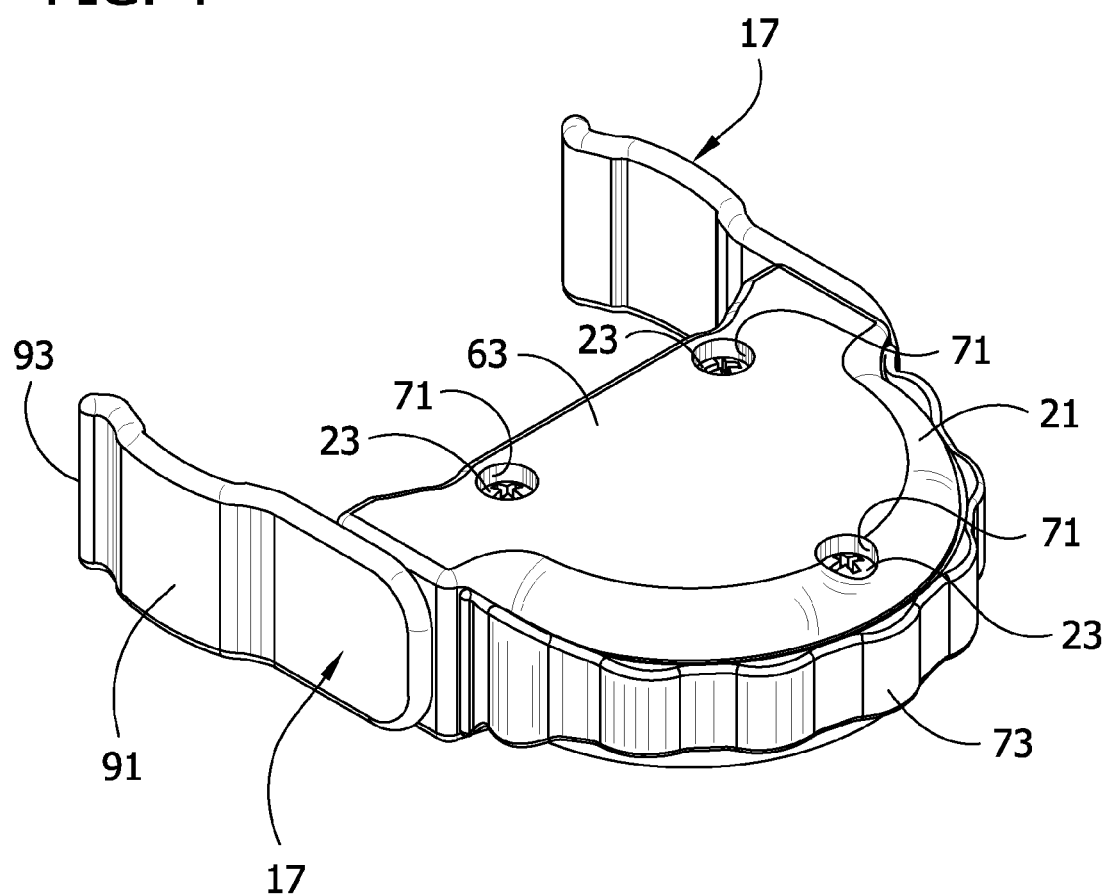
FIG. 4 is a bottom side perspective view of the level.
Figure 6:
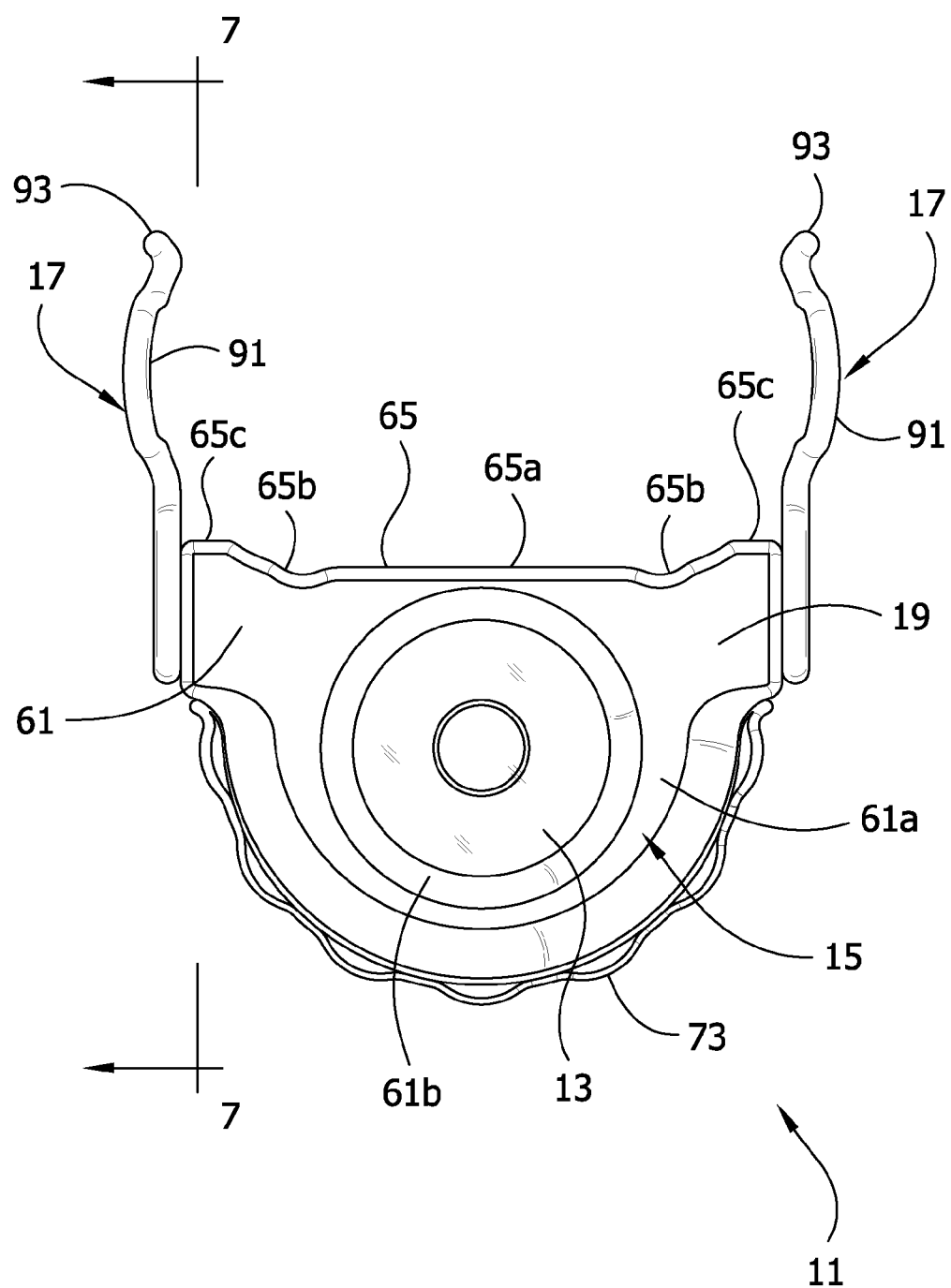
FIG. 6 is a top plan view of the level.
Figure 7:
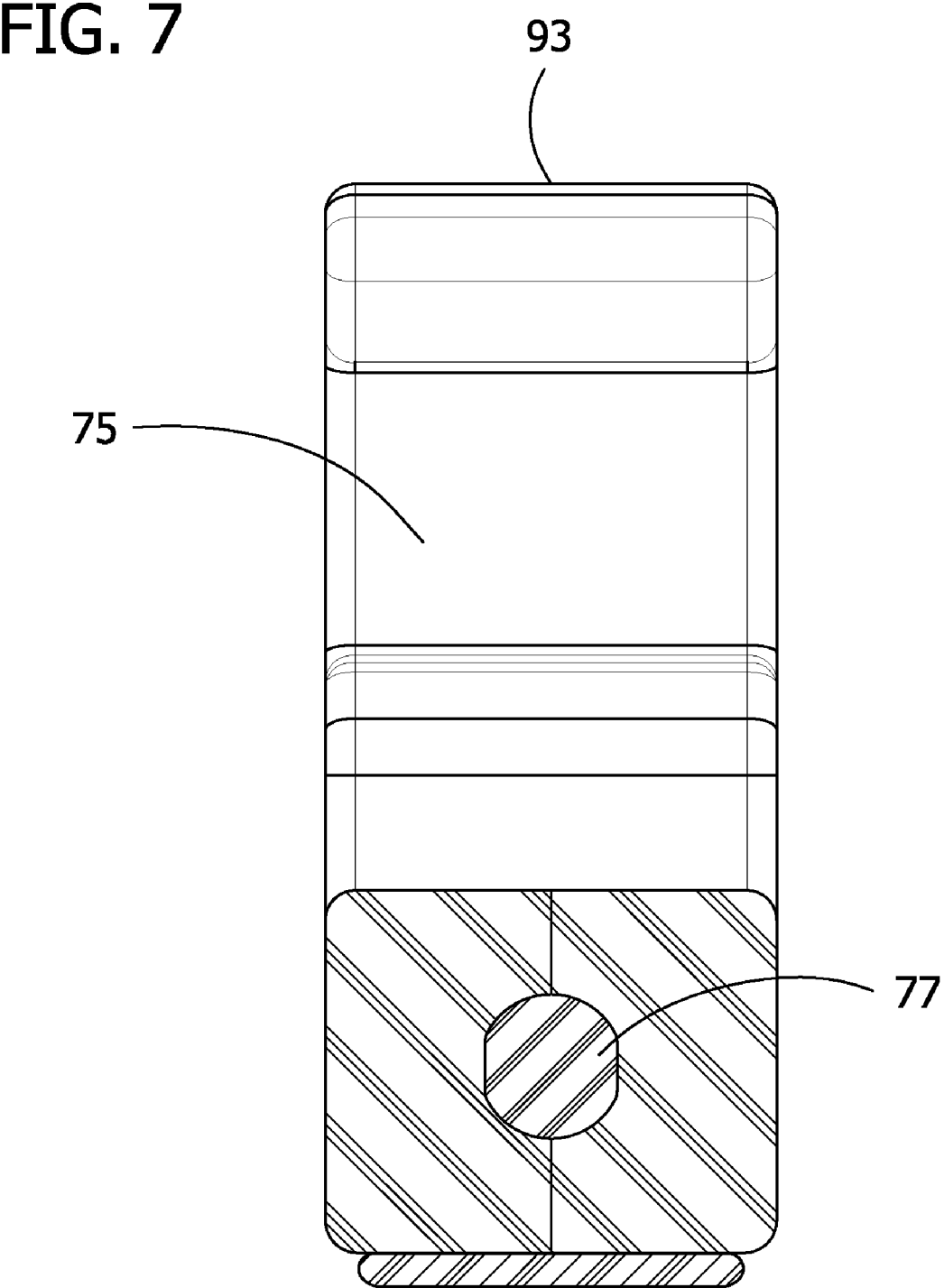
FIG. 7 is a section taken in the plane including line 7-7 of FIG. 6.

As illustrated in FIGS. 2, 4, and 6, the body 15 includes an upper surface 61, a bottom surface 63, a front 65, a back 67, and two sides 69. The upper surface 61 includes a plateau 61a and a beveled edge 61b that extends from the plateau toward the opening 51 in the upper housing member 19 (FIG. 2). The bottom surface 63, which is shown in FIGS. 4 and 5, has three recesses 71 for receiving heads of the fasteners 23 used to secure the lower housing member 21 to the upper housing member 19. The sides 69 of the level 11 are generally flat, square shaped surfaces with oval openings therein. The oval openings provide passage to cavities defined by the mating of the framework 27, 45 adjacent the frustoconical recesses 39, 57 of the upper and lower housing members 19, 21. In other words, the cutouts 39, 57 in the framework 27, 45 of the upper and lower housing members 19, 21 cooperatively define the oval openings. As a result, the tops and bottoms of the oval openings are generally flat and the ends of the oval openings are generally arcuate (FIG. 7).

The back 67 of the body 15, as shown in FIG. 4, is generally arcuate and includes a grip 73. The grip, having an exterior surface that undulates along its length, and the arcuate shape of the body 15 make it easy for a user to securely grasp and otherwise handle the level 11. As shown in FIGS. 3 and 5, the grip 73 includes a gripping portion 73a, two elongate tongues 73b, and a rib 73c extending between the gripping portion and the two elongate tongues. With the upper and lower housing members 19, 21 secured together, the tongues 73b are located in the arcuate channels 33, 49 of the upper and lower housing members 19, 21 and the rib 73c extends between the shorter back exterior walls 37, 55 of the housing members. The remainder of the grip 73 is located outside the housing members 19, 21. Accordingly, the grip 73 is captured by the mating of the upper and lower housing 19, 21. It is understood that the grip 73 can be attached to the body 15 in other ways (e.g., bonding).

The illustrated grip 73 is formed from an elastomeric material (e.g., natural or synthetic rubbers). Suitable synthetic rubbers include thermoplastic elastomers (TPE) and thermoset elastomers (TSE). One suitable TPE material includes MULTI-FLEX TPE A4001 LC manufactured by Multibase, Inc. (a Dow Corning Company) of Copley, Ohio, U.S.A. This material has a durometer (hardness) of approximately 34 Shore A but it is understood that the materials with different durometers can be used. Preferably, the material has durometer below 100 Shore A. More preferably, the material used has a durometer in a range between about 25 and 50, which provides a grip with a softer and better feel. It is understood that the grip 73 can be formed from other materials besides elastomeric material and formed from other types of elastomeric material besides the one listed herein.

Referring now to FIGS. 1 and 2, the front 65 of the body 15 is shaped to generally conform to the survey rod SR. More specifically, the front 65 includes a generally flat central portion 65a, angled portions 65b flanking the central portion, and generally flat outer portions 65c located outward from and adjacent each of the angled portions. The flat portions 65c are generally parallel to the central portion 65a. As a result and as shown in FIG. 1, the front 65 of the level 11 is generally flush and in full contact with the front F (or back B) of the survey rod SR when the level is attached thereto. In addition, a portion of the front 65 of the level 11 engages and is generally flush with part of the arcuate sides S of the survey rod. The flush engagement between the level 11 and the survey rod SR inhibits canting of the level with respect to the survey rod. As a result, the level 11 remains transverse to the longitudinal axis of the survey rod SR so that the survey rod can be easily and accurately vertically collimated using the level.

The bubble vial 13, which is cylindrical, is disposed in the circular recess 29 in the lower housing member 21 so that the vial is supported by the cruciform support 35 of the lower housing member and aligned with the opening 51 in the upper housing member 19. The flange 53 of the upper housing member 19 adjacent the opening 51 therein extends over an outer portion of the vial 13 to secure the vial within the body 15. The bubble vial 13 fits snuggly into the framework 27, 45 defining the circular recess 29 in the lower housing member 21 and the opening 51 in the upper housing member 19 to prevent movement of the vial (e.g., canting, sliding) with respect to the upper and lower housing members. As illustrated in FIG. 6, the top of the bubble vial 13 is clearly visible through the opening 51 in the upper housing member 19. In the illustrated configuration, the bubble vial 13 has a width of about 1-inch (i.e., 1-inch diameter) but it is understood that the bubble vial can have different sizes. It is also understood that different types and configurations of level indicators besides the illustrated bubble vial can be used.

Referring again to FIGS. 3 and 5, each of the arms 17 includes an elongate web 75 having an attaching portion and a connecting portion. The attaching portions are adapted for attaching the arms 17 to the body 15. Specifically, the attaching portions include a stub shaft 77 extending outwardly from the web 75 and an enlarged tab 79 attached to an end of the stub shaft spaced from the web. The stub shaft 77 and tabs 79 are generally oval with flat upper and lower surfaces and semi-circular ends. The stub shaft 77 extends through the openings defined by the cutouts 39, 57 in the upper and lower housing members 19, 21 of the body 15 so that the enlarged tab 79 is received in the cavity defined by the half frustoconical recesses 31, 47 of the upper and lower housing members to thereby attach the arms 17 to the body. Since the tabs 79 have a greater diameter than the openings, the tabs cannot be pulled through the openings. Accordingly, the arms 17 are secured to the body 15 via capturing the enlarged tabs 79 in the cavities defined by the half frustoconical recesses 31, 47 in the upper and lower housing members 19, 21.

The arms 17 are pivotable from an operative position (e.g., FIGS. 2 and 8) to a stowed position (e.g., FIGS. 11-14). In the stowed position, the level 11 is more compact to allow the level to be easily put in a pocket or otherwise stored. More specifically, in the stowed position, the arms 17 of the lever 11 are rotated approximately 180° from the operative position so that they are disposed adjacent to and substantially in registration with the body 15. It is understood, however, the arms 17 can be pivotable more or less than 180° between the operative and stowed positions.

Figure 14:
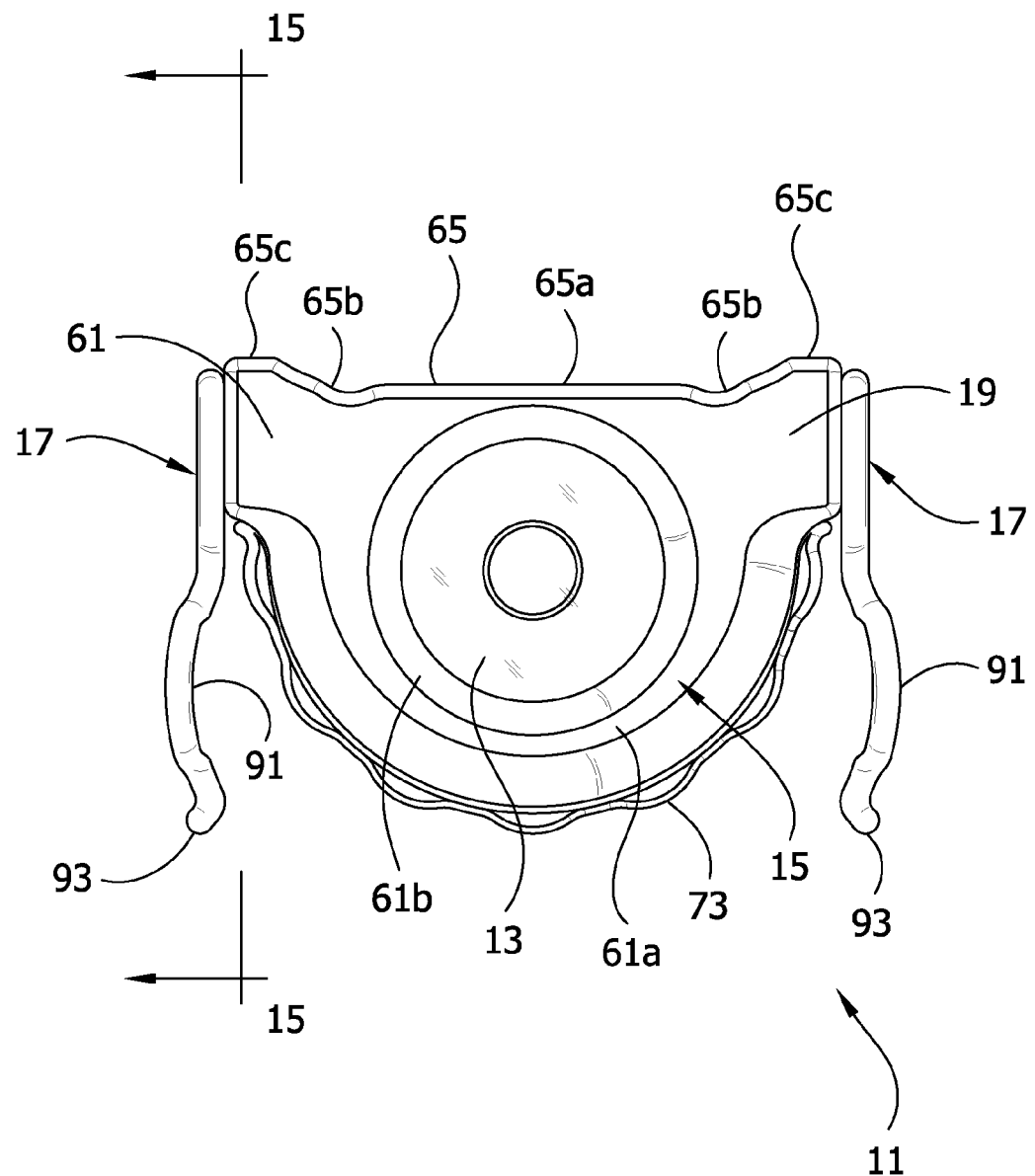
FIG. 14 is a top plan view of the level.
Figure 15:
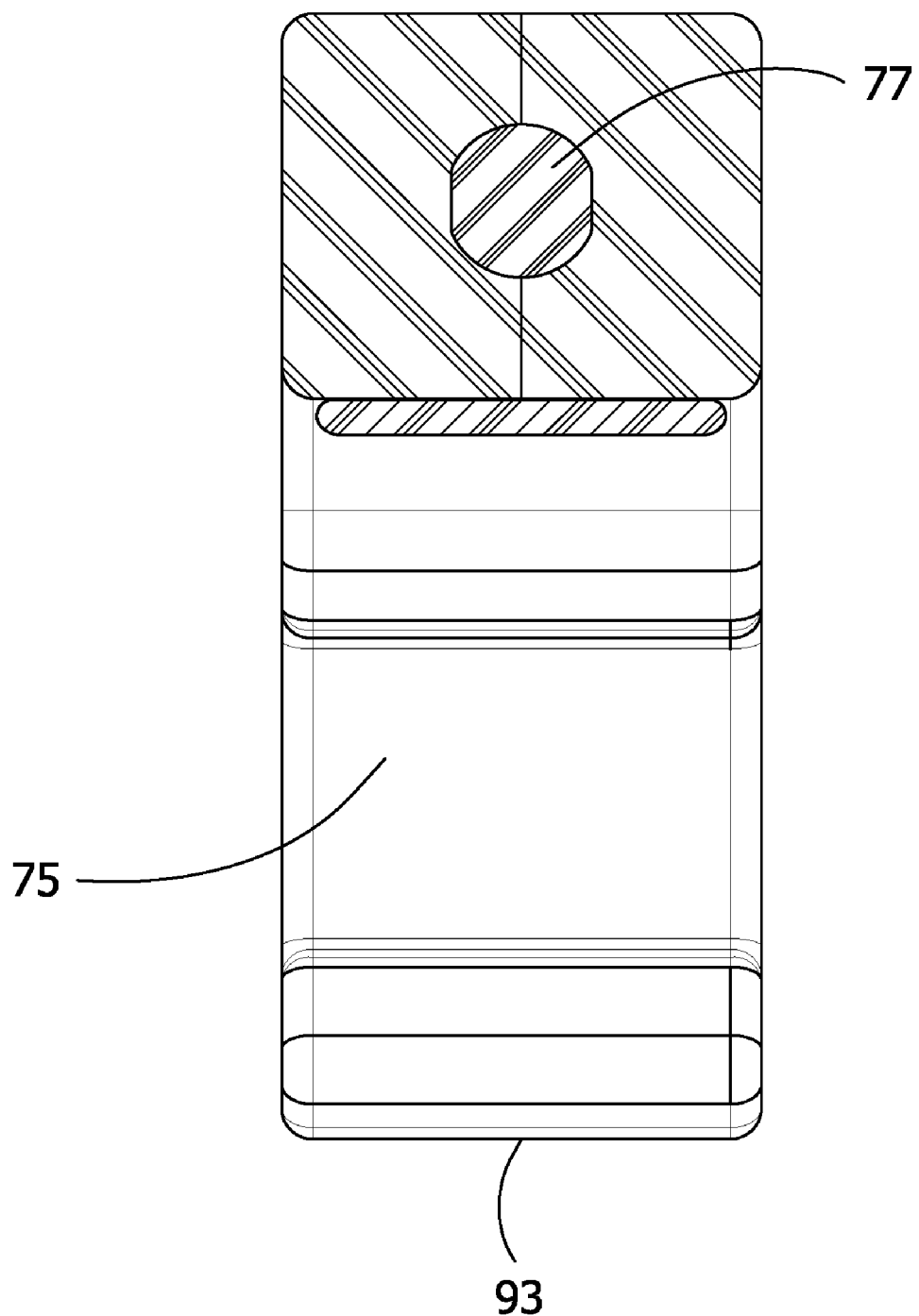
FIG. 15 is a section taken in the plane including line 15-15 of FIG. 14.

In the operative position, the arms 17 are held from rotation because of the interaction between the stub shafts 77 of the arms and the shape of the cutouts 39, 57 in the upper and lower housing members 19, 21. Both the stub shafts 77 and the cutouts 39, 57 have lengths greater than their widths (FIG. 7). This discrepancy in the dimensions between the lengths and the widths inhibits rotation of the arms 17. Thus, the arms 17 in the operative position will not freely rotate to the stowed position. Instead, to pivot the arms 17 from the operative position to the stowed position (or vice versa), the length of the stub shafts 77 of the arms has to pass through the narrow widths in the openings (FIGS. 9 and 10) defined by the cutouts 39, 57. The resiliency of the body 15 of the level 11 allows the body to slightly deform under a threshold force while the length of the stub shaft 77 passes through the narrower width of the oval openings toward the stowed position. Once in the stowed position, the discrepancy in the dimensions between the lengths of the stub shafts 77 of the arms 17 and the widths of the oval openings again inhibits rotation of the arms (FIGS. 14 and 15).

Figure 8:
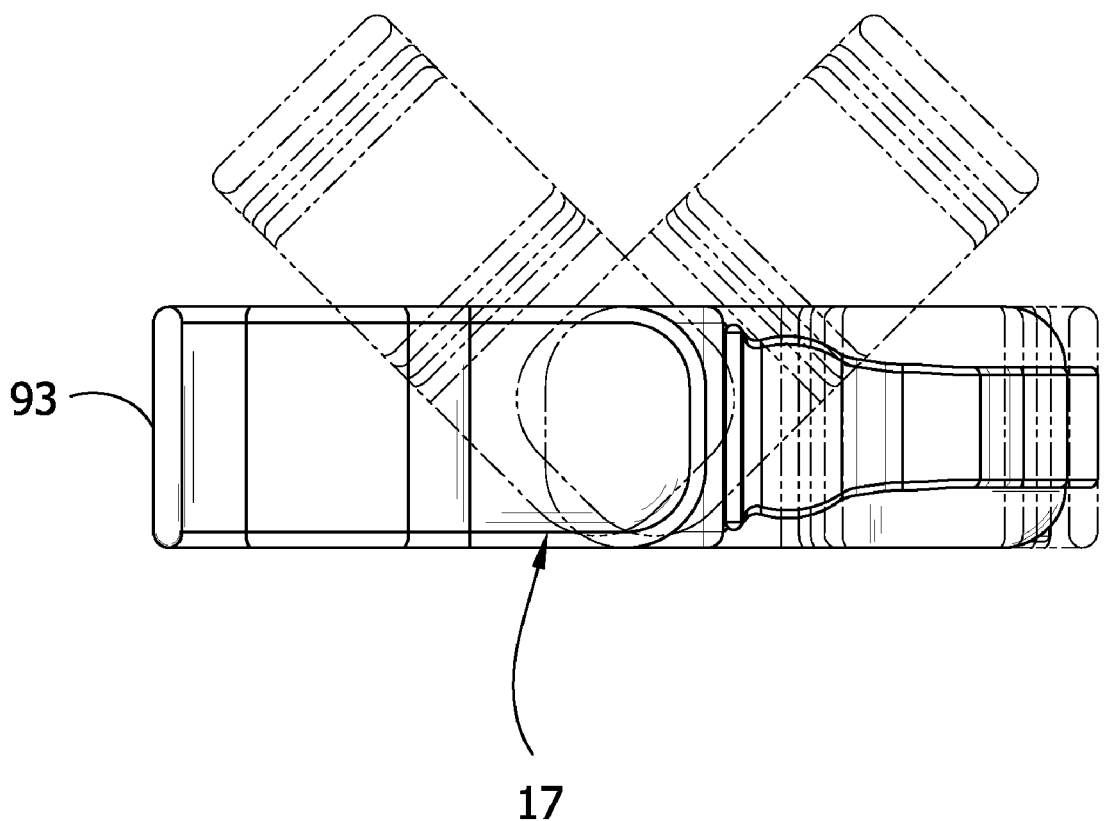
FIG. 8 is a side elevation showing the arms in the operative position and, in phantom, the arms in a stowed position.
Figure 9:
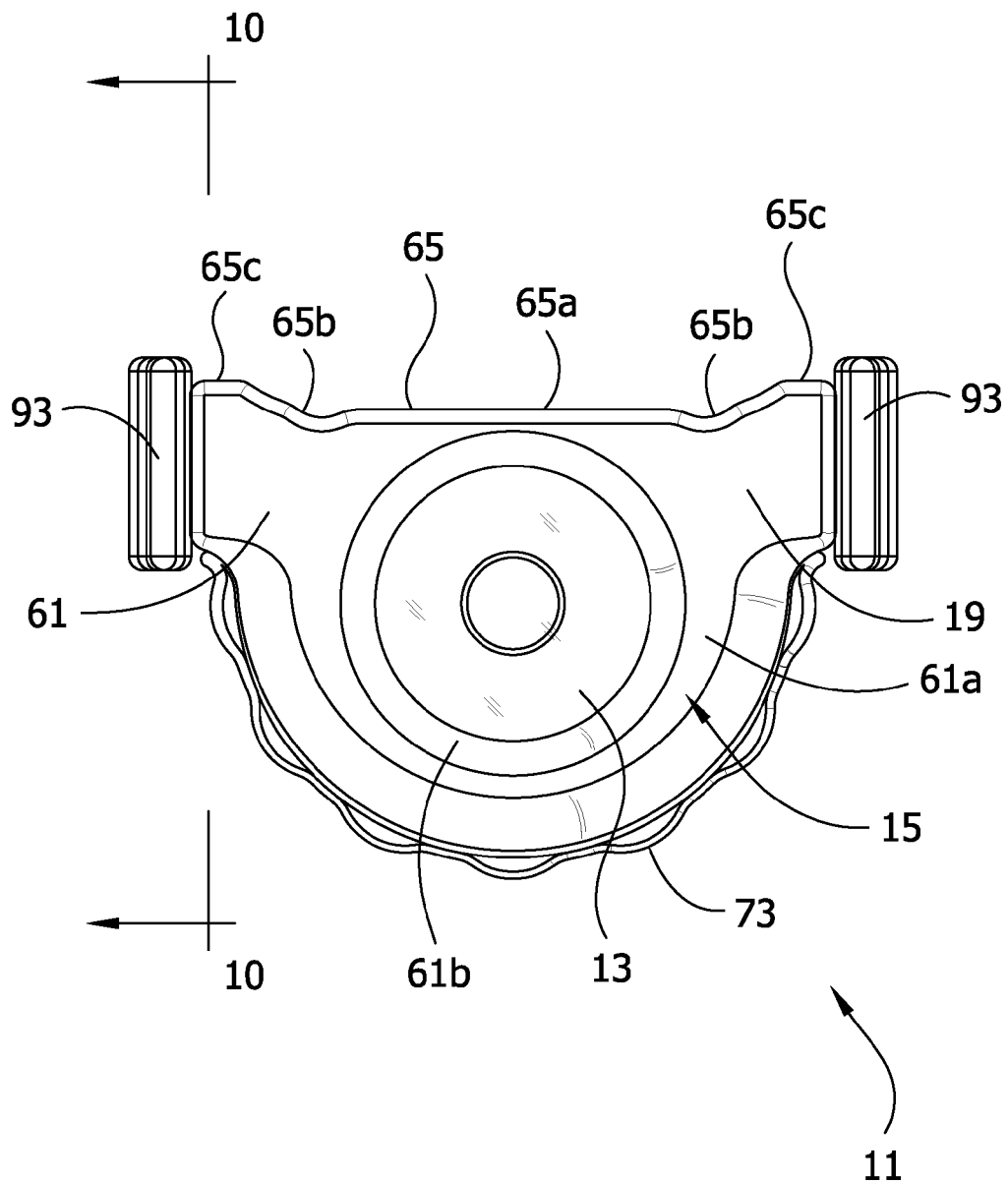
FIG. 9 is a top plan view similar to FIG. 6 but showing the arms being pivoted from the operative position to a stowed position.
Figure 10:
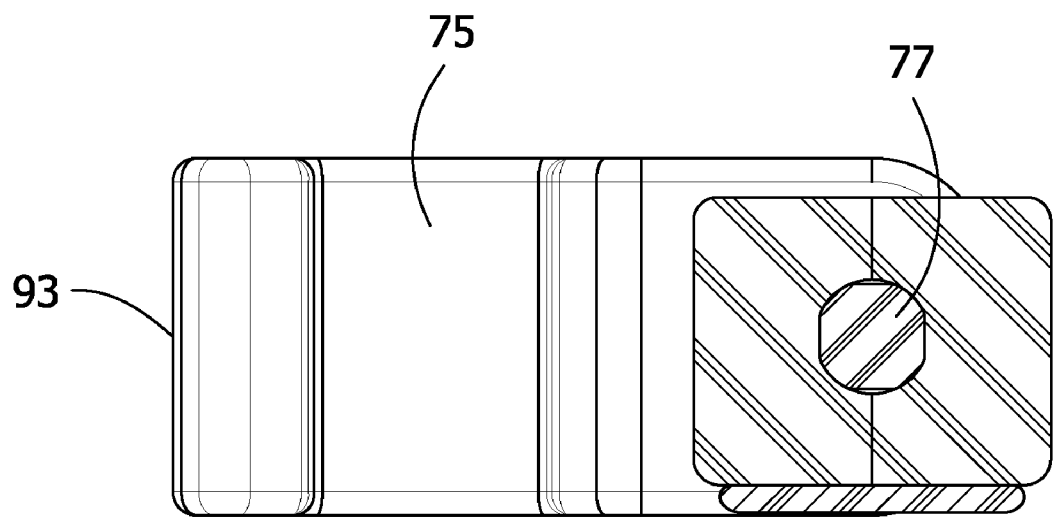
FIG. 10 is a section taken in the plane including line 10-10 of FIG. 9.
Figure 11:
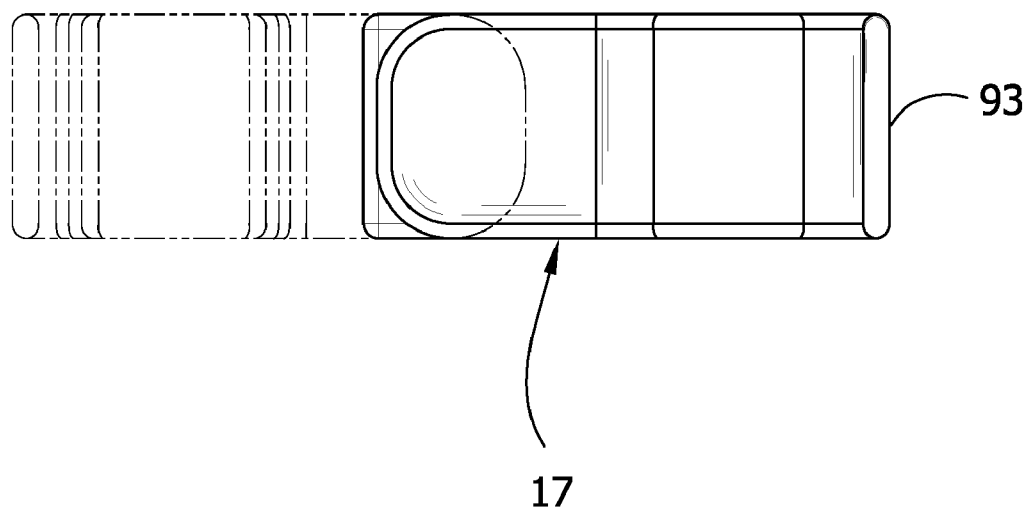
FIG. 11 is a side elevation showing the arms in the stowed position and, in phantom, the arms in the operative position
Figure 12:
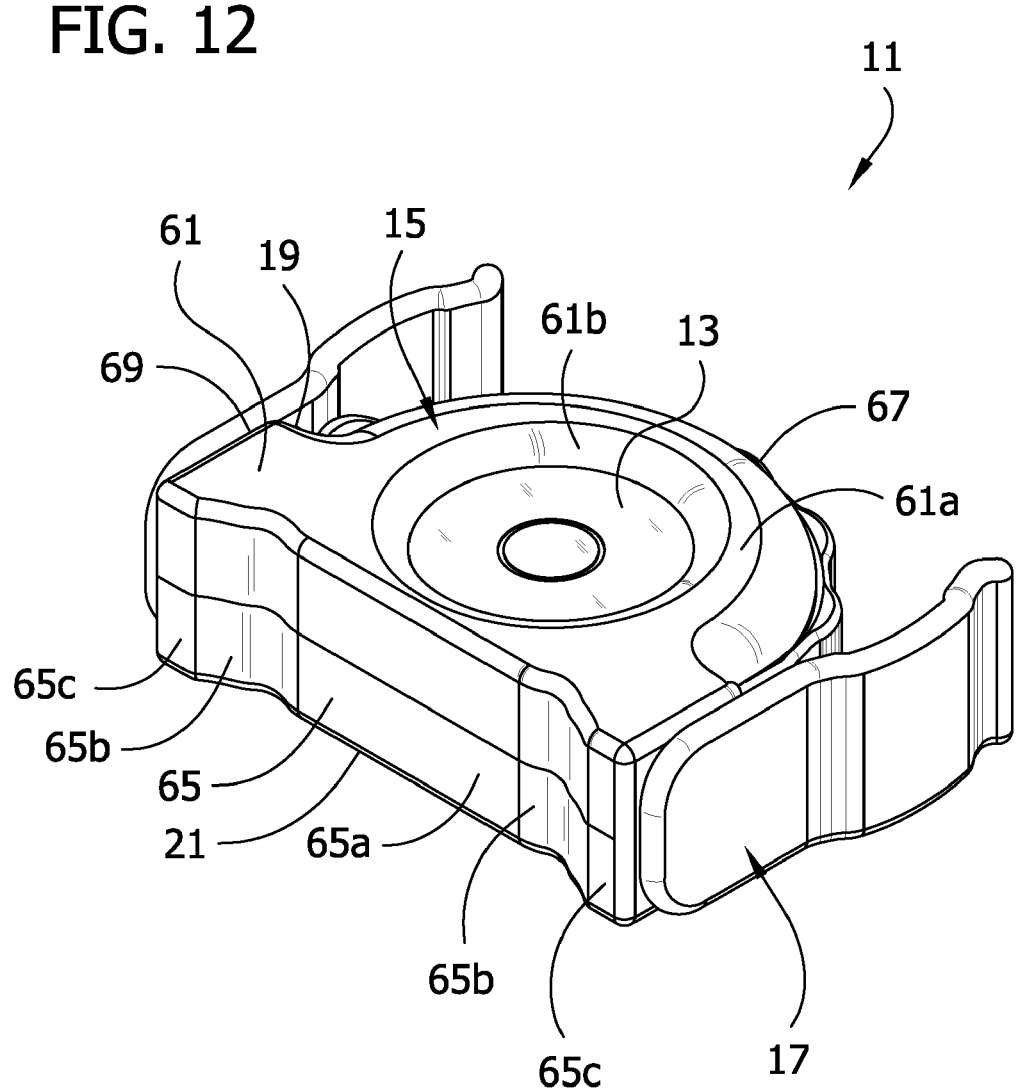
FIG. 12 is a top side perspective view of the level with the arms of the level in the stowed position.
Figure 13:
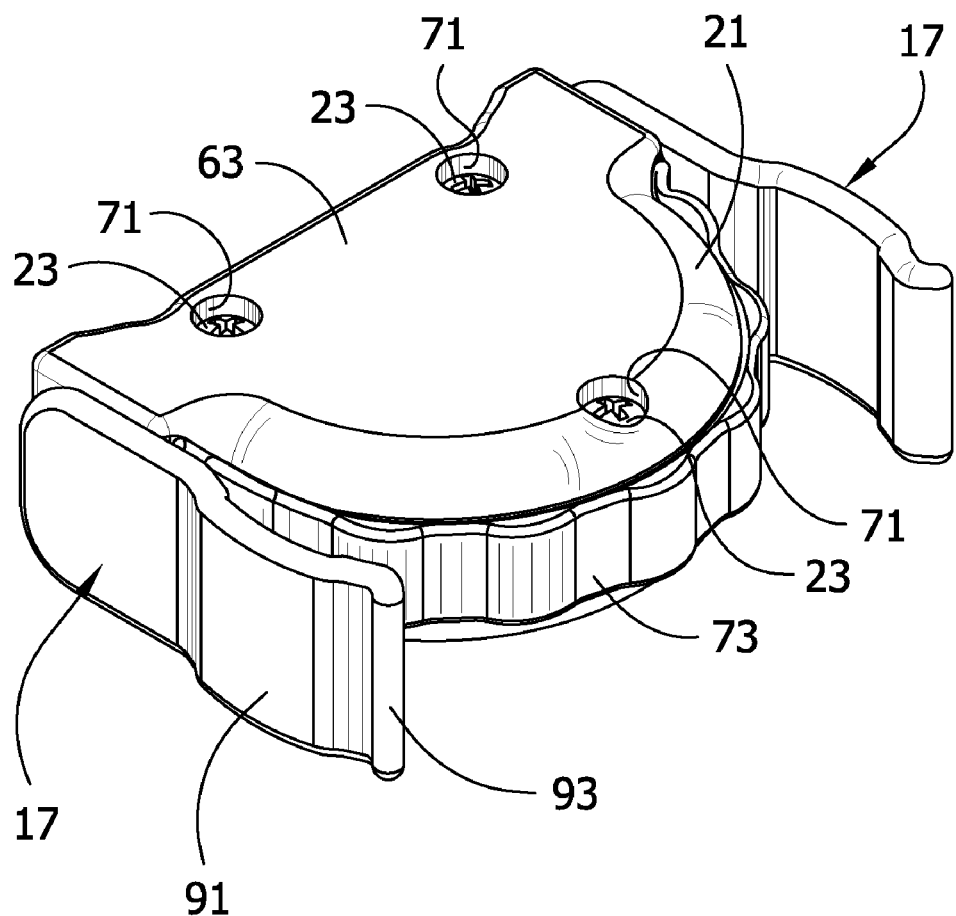
FIG. 13 is a bottom side perspective view thereof.

Stated another way, in the operative position the flats of the cutouts 39, 57 receive the flat portions of the stub shafts 77 and the arcuate portions of the cutouts receive the semicircular portions of the stub shafts (FIG. 7). To move the arms 17 from the operative position to the stowed position (or vice versa), the semicircular portions of the stub shafts 77 have to fit past the flats of the cutouts 39, 57 in the upper and lower housing members 19, 21. The resiliency of the body 15 of the level 11 allows the body to slightly deform under a threshold force while the semicircular ends of the stub shaft 77 passes through the flats of the cutouts 39, 57 toward the stowed position (FIGS. 8 and 9). Once in the stowed position, the flats of the cutouts 39, 57 are again receiving the flat portions of the stub shafts 77 and the arcuate portions of the cutouts again receive the semicircular portions of the stub shafts to resist rotation away from the stowed position (FIGS. 14 and 15).

The connecting portions of each of the arms 17 are adapted for securing the level 11 to the survey rod SR via a snap-fit connection. Specifically, the arms 17 comprise an arcuate segment 91 and a finger 93 located outward from the arcuate segment. The finger 93 curves outward at its end to facilitate attaching the level 11 to the survey rod SR. The arcuate segments 91 are sized and shaped for receiving the ribs R extending along the sides S of the survey rod SR. With the arms 17 in their operative position (FIG. 2), the level 11 is placed against the survey rod SR such that the fingers 93 of each of the arms 17 contact opposite sides S of the survey rod. The level 11 is manually pushed toward the survey rod SR with the pushing force being applied generally transverse to the longitudinal axis of the survey rod. The force causes each of the fingers 93 to slide against the arcuate surfaces of the respective sides S and thereby resiliently widen the space between the arms 17. The curved, outwardly flaring ends of the fingers 93 act as inclined surfaces that upon engagement with the survey rod SR help to wedge the arms 17 apart for snap fitting onto the survey rod. The level 11 is pushed toward the survey rod SR until the fingers 93 pass the longitudinally extending ribs R on the survey rod and the arcuate segments 91 of each arm 17 generally conformally receive the respective rib. Upon the fingers 93 of the arms 17 passing the ribs R, the resiliency of the arms causes the arms to snap back and firmly grip the sides of the survey rod SR. In short, the arms 17 of the level 11 have a snap-fit connection with the survey rod SR to secure the level to the rod.

The resiliency of the arms 17 also allows the level 11 to be manually pulled from the survey rod SR. The level 11 is designed for repeated use. That is, the level 11 is adapted to be secured to and removed from survey rod SR numerous times. Thus, the level 11 can be repeatedly secured to the survey rod SR in its operative position, removed, moved to its stowed position, and stored until it is needed again. It is understood that the level can have a body and/or arms with different configurations without departing from the scope of this invention. For example, the body and arms of the level can be configured for securing to other types of geomatics target devices besides a survey rod (e.g., a prism pole).

The body 15 and arms 17 of the level 11, excluding the grip 73, vial 13, and fasteners 23, are formed from nylon but it is understood other materials can be used. The body 15 and arms 17 of the illustrated level 11 are formed using NYLOY MS-0100B, which is available from Nytex Composites Co., Ltd. with offices in Peitouhsiang, Changhwa County, Taiwan. This material has good strength properties and is resistant to most chemicals. At room temperature, its impact strength is 18.9 ft-lb/in and its hardness is 74 Shore D. It is understood however that the components of level can be formed from other materials without departing from the scope of this invention.

FIGS. 16-21 illustrate a second configuration of a level that is substantially similar to the level 11 shown in FIGS. 1-15. The level of this configuration is indicated generally at 111, and parts of this level corresponding to parts of the level 11 of the first configuration (FIGS. 1-15) are indicated by the same reference numbers, plus "100". Similar to the previous configuration, the level 111 of this configuration includes a body 115 and arms 117 pivotal with respect to the body between an operative position and a stowed position. The level 111 of this configuration differs from that of the first configuration in that each side 169 of the body 115 include detents 181 adjacent a generally circular opening 182 therein (one of the sides being illustrated in FIG. 18). The detents 181 are disposed on opposite (front and rear) sides of the opening 182.

Figure 16:
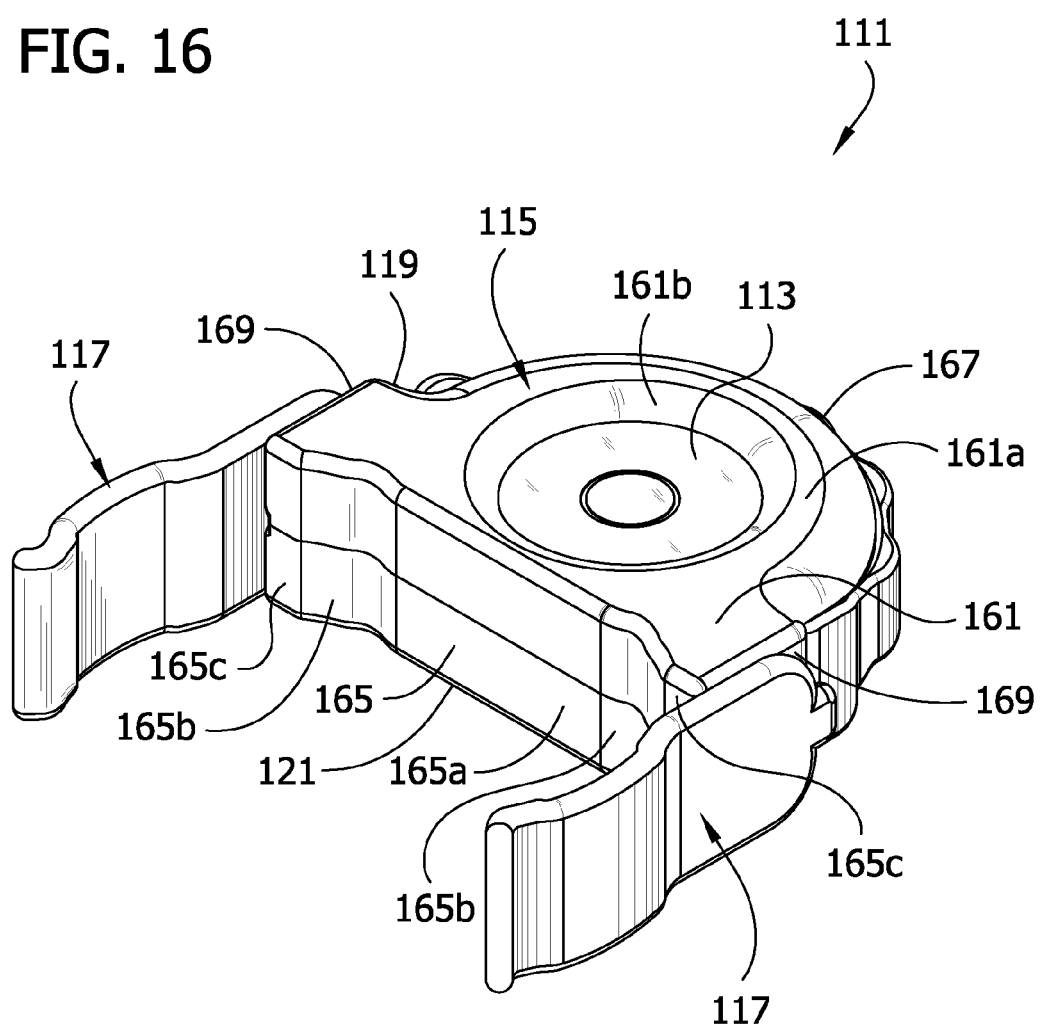
FIG. 16 is a perspective view of a level of a second configuration.
Figure 17:
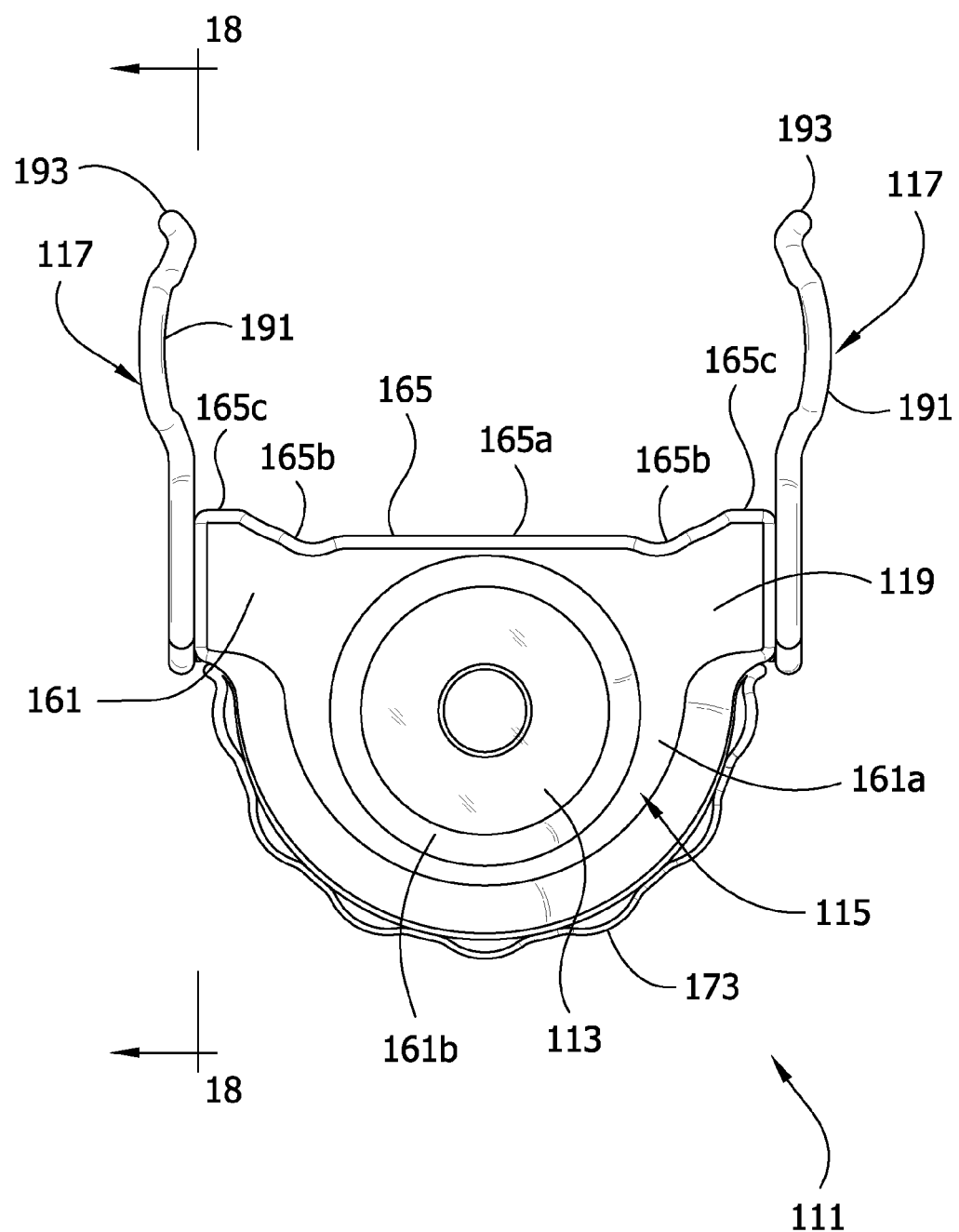
FIG. 17 is a top plan view thereof.
Figure 18:
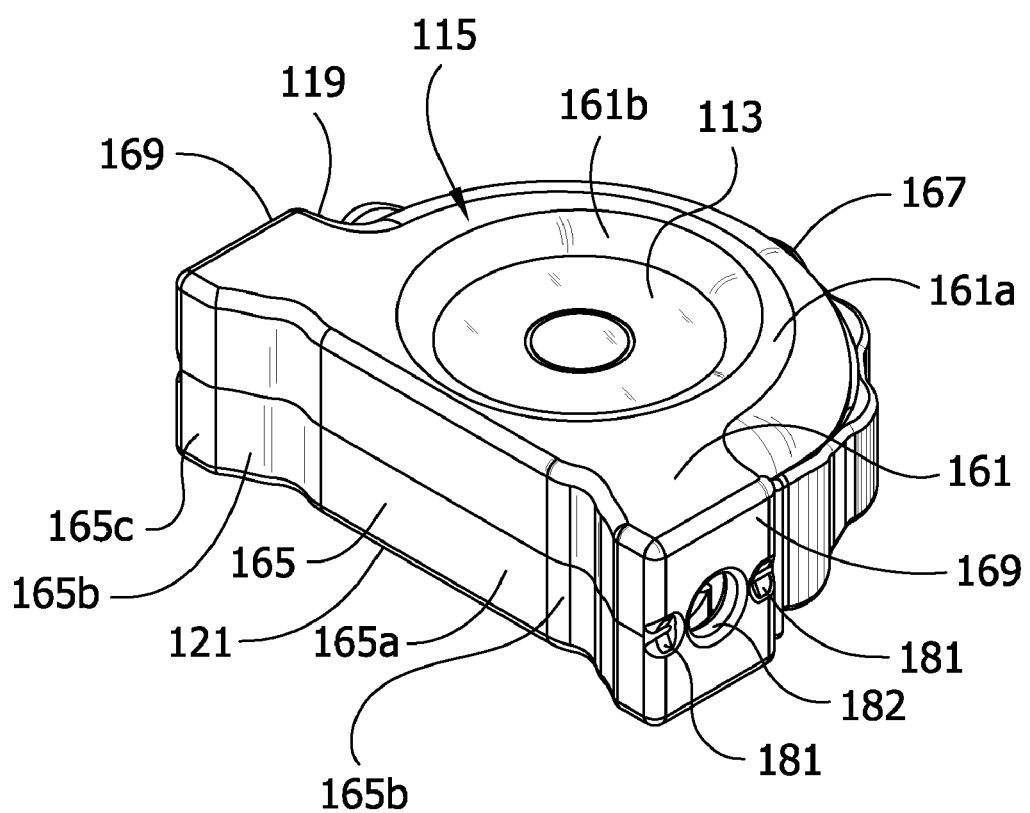
FIG. 18 is a perspective view of the level of FIG. 14 with arms of the level removed.
Figure 19:
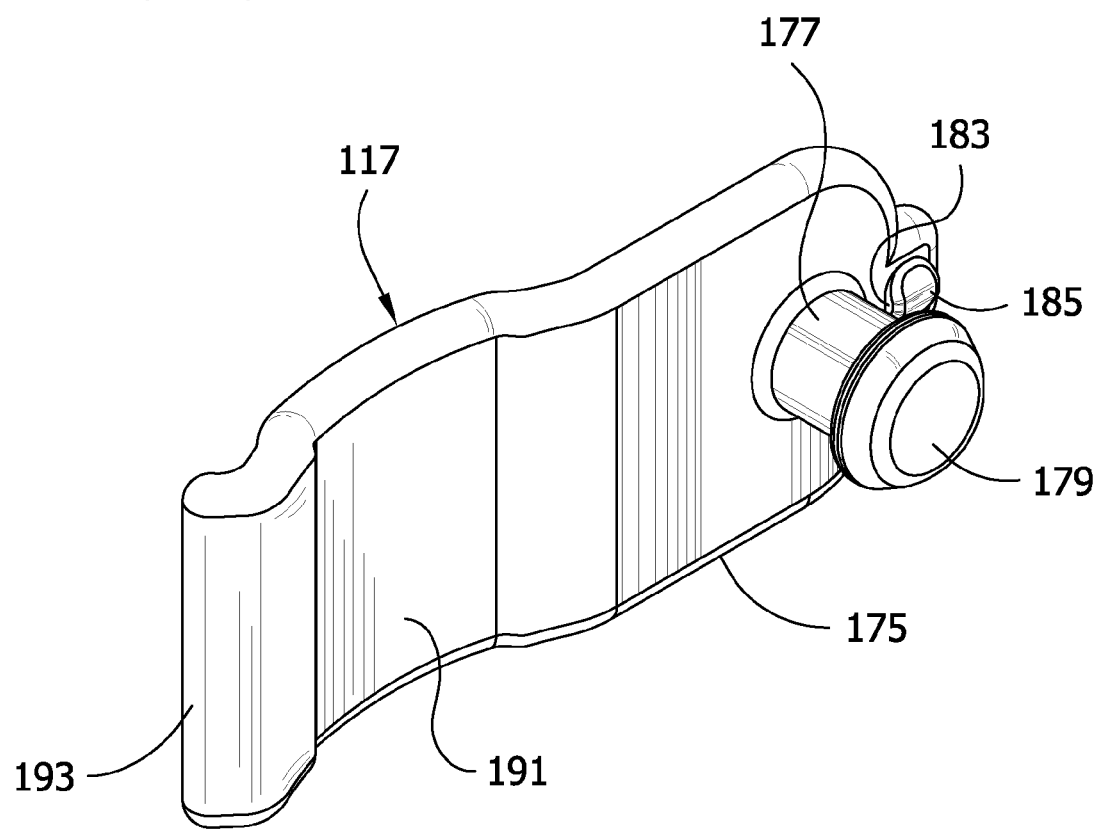
FIG. 19 is a perspective view of one of the arms removed from the level.
Figure 20:
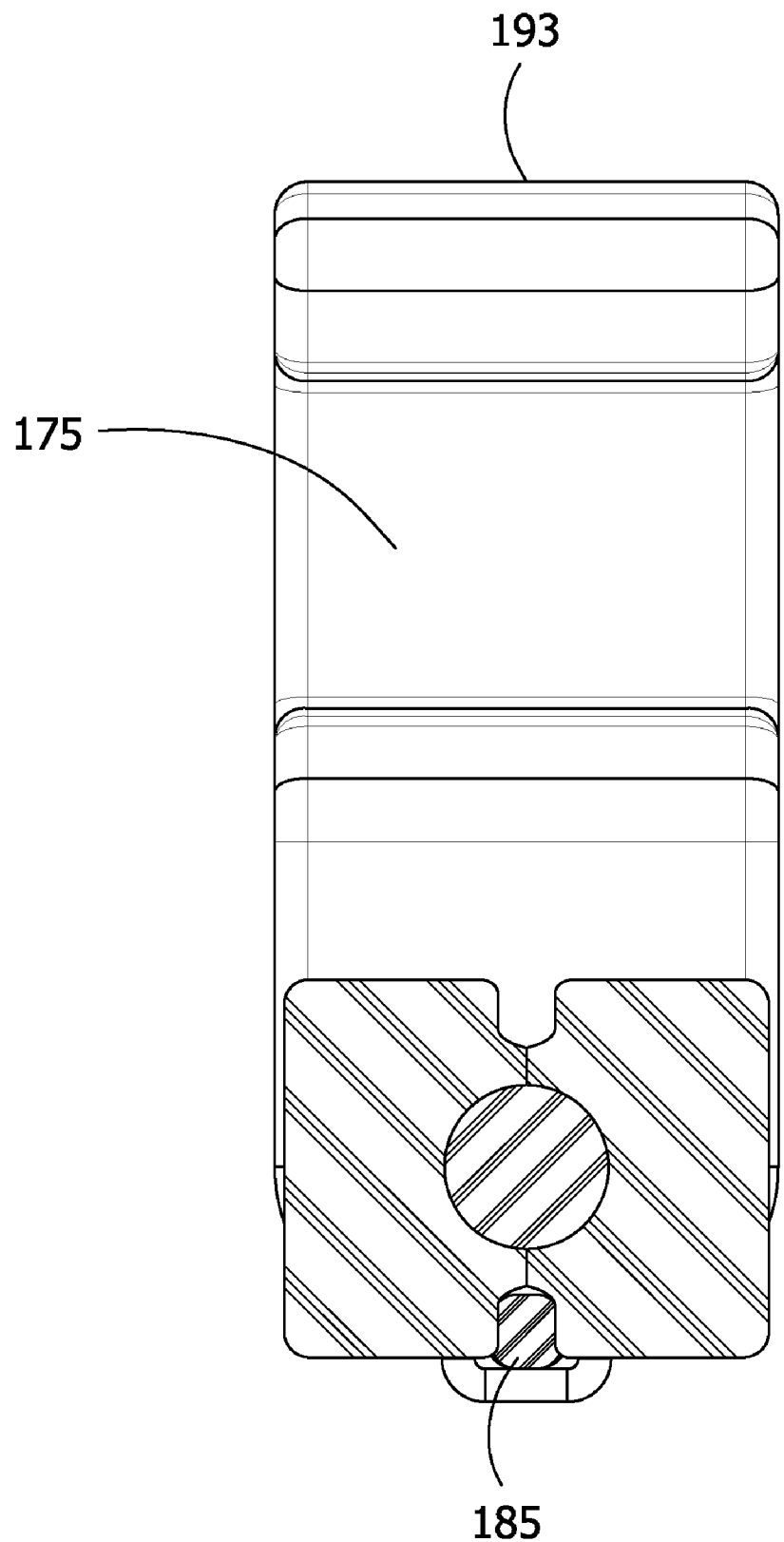
FIG. 20 is a section taken in the plane including line 20-20 of FIG. 17.

Referring now to FIG. 19, arms 117 of this configuration include a tab 183 and a nub 185 extending outward from the tab (only one of the arms being illustrated in FIG. 19). The nub 185 of each arm 117 includes a generally curved surface and is positioned so that it aligns with one of the respective detents 181 located in the sides 169 of the level 111. The arms 117 are held from rotation because of the interaction between the nubs 185 of the arms and the detents 181 on the sides 169 of the arms. In the operative position, which is illustrated in FIGS. 16 and 17, the nub 185 of each of the arms 117 is received in one of the detents 181 on the sides 169 of the body 115. Thus, the arms 117 in the operative position will not freely rotate to the stowed position. Instead, to pivot the arms 117 from the operative position to the stowed position (or vice versa), the nubs 185 of the arms have to rotate out of the respective detent 181, pass across the surface of the respective side 169 of the body 115, and be captured by the opposite detent. The resiliency of the arms 117 of the level 111 allows the arms and/or body 115 to slightly deform under a threshold force while the arms are being rotated. Once in the stowed position (not shown for this configuration), the nubs 185 of the arms 117 and detents 181 in the sides 169 of the body 115 cooperatively inhibit rotation of the arms.

Figure 21:
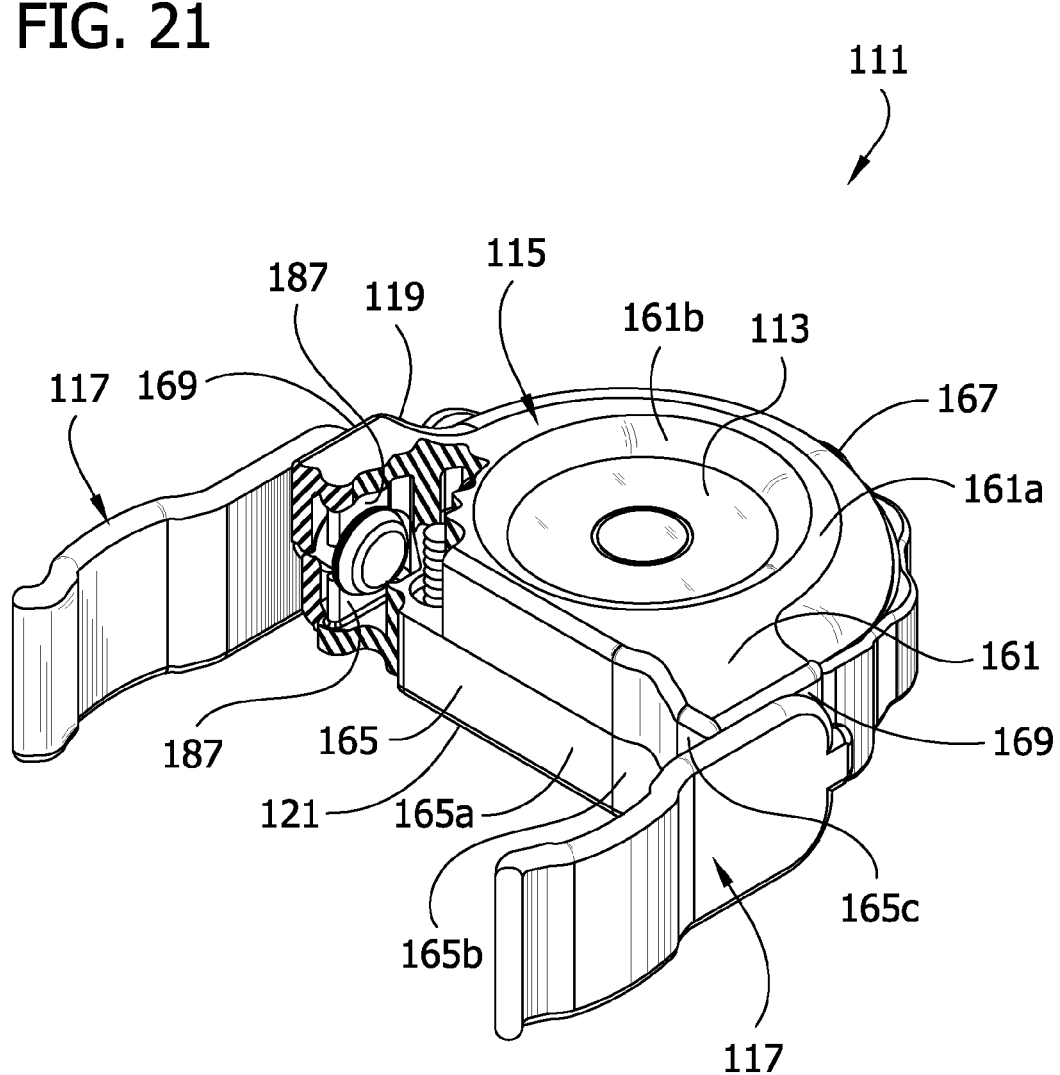
FIG. 21 is a top side perspective view of the level with portions broken away to show internal construction.
Figure 22:
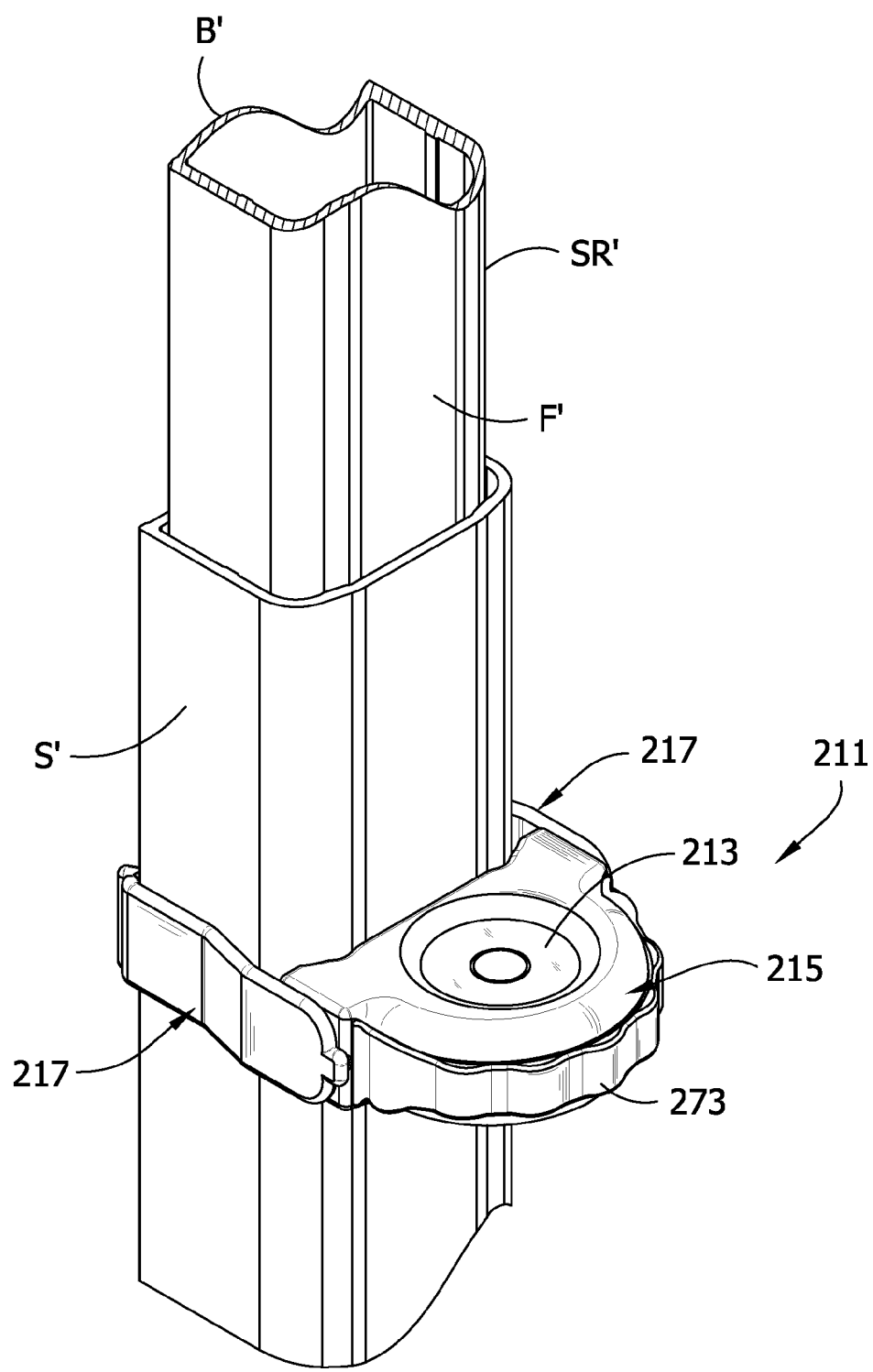
FIG. 22 is a perspective view of a level of a third configuration attached to a survey rod, only a fragmentary portion of the survey rod being shown.
Figure 23:
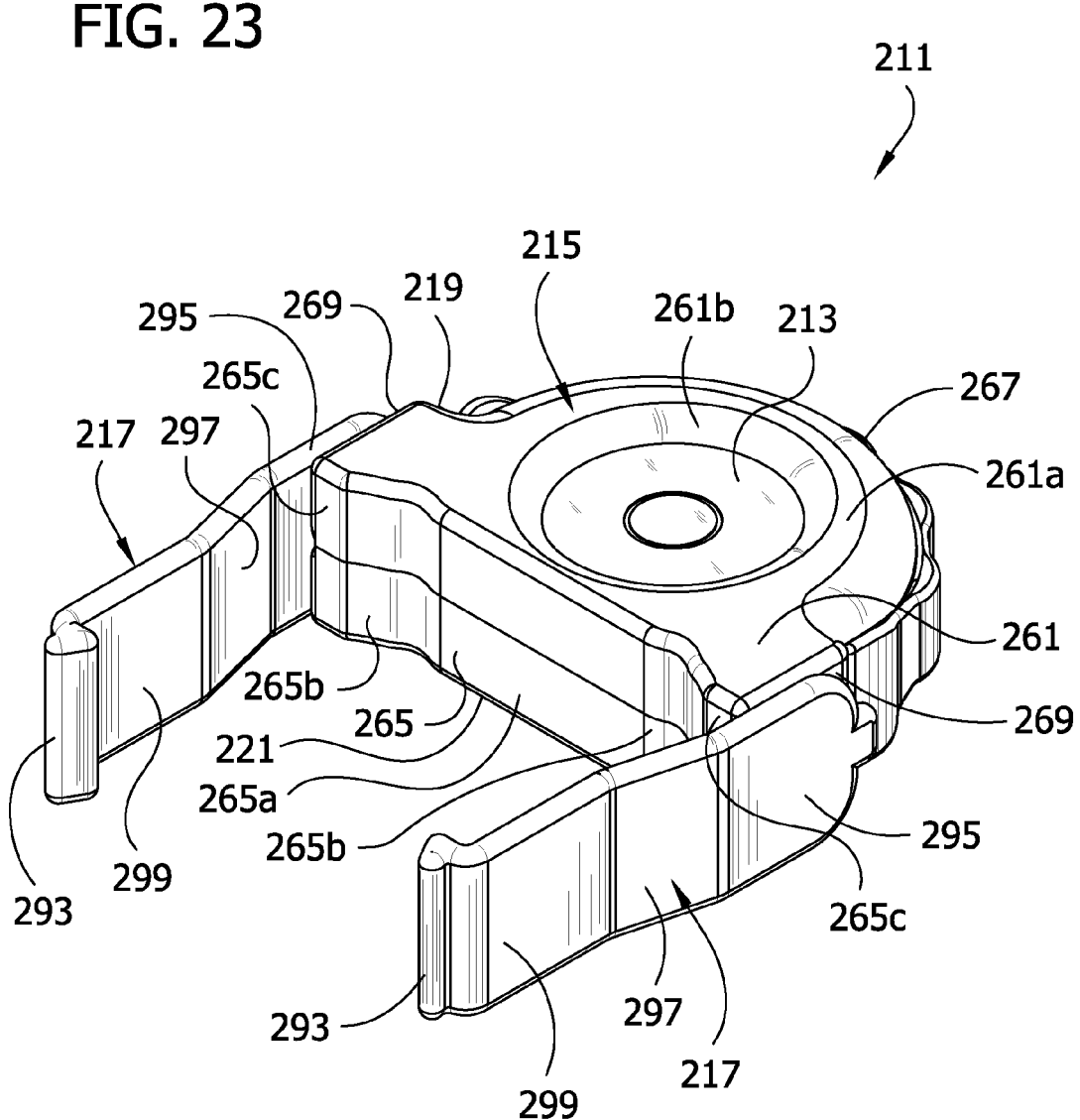
FIG. 23 is a top side perspective view of the level removed from the survey rod and with arms of the level in an operative position.
Figure 24:
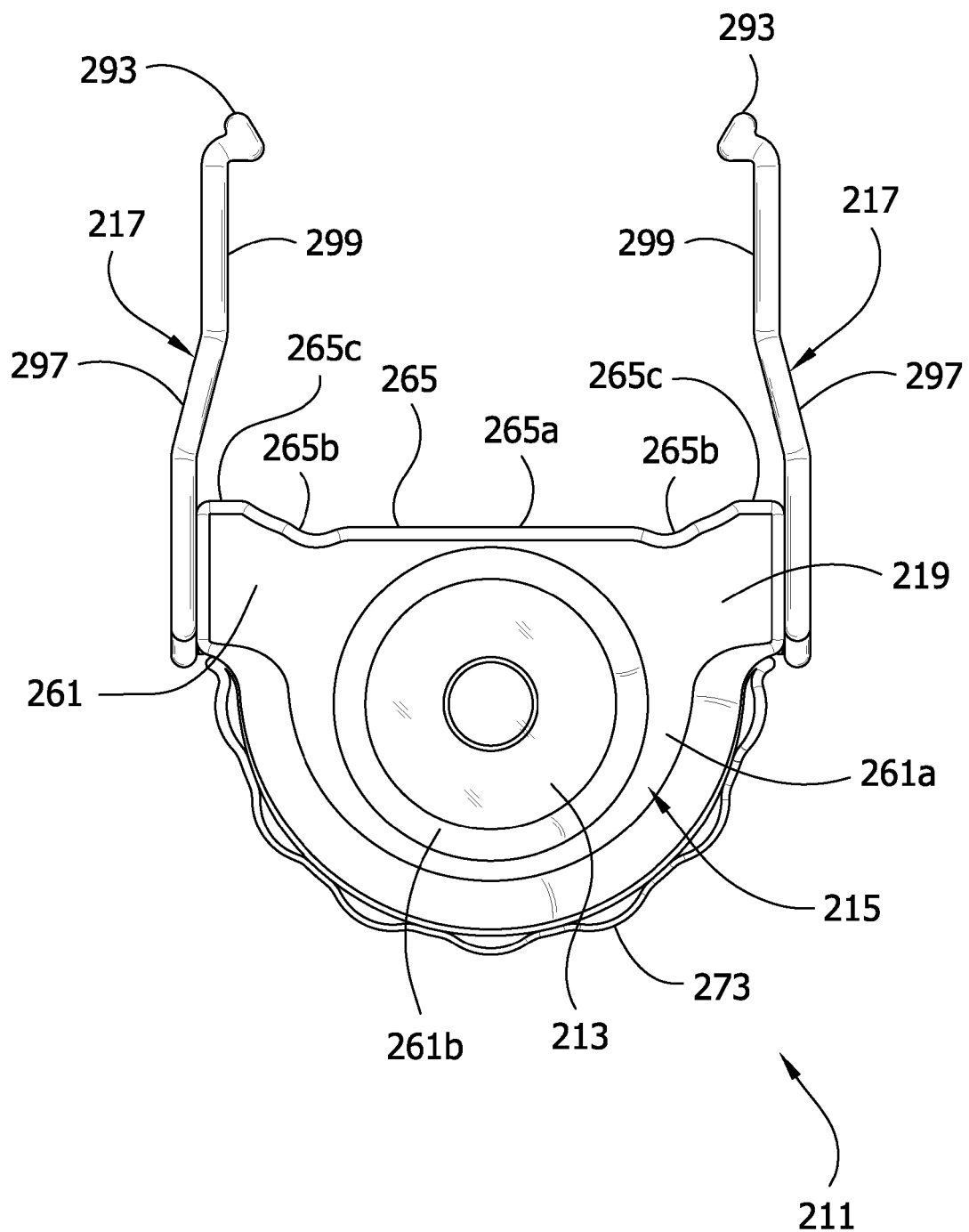
FIG. 24 is a top plan view thereof.
Figure 25:
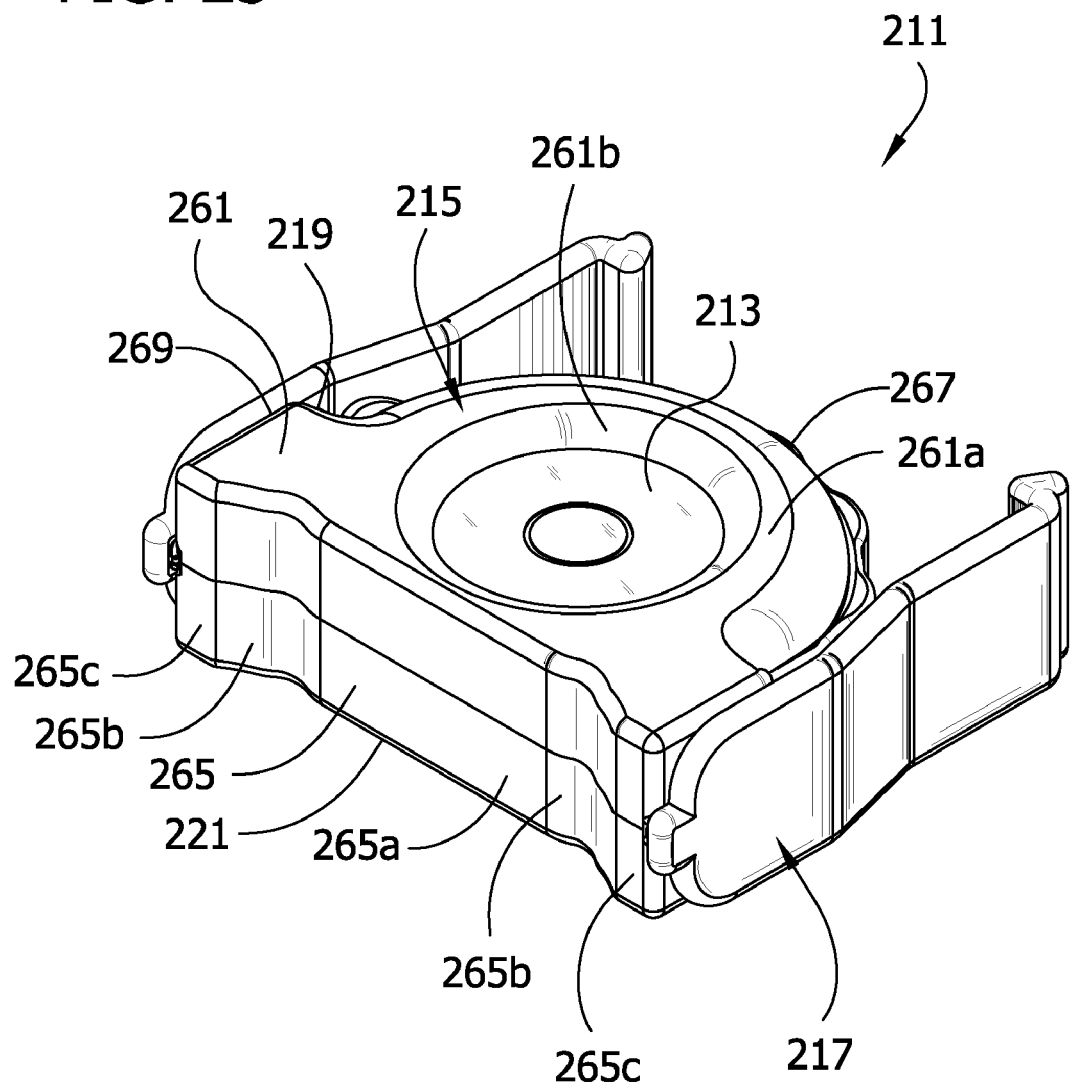
FIG. 25 is a top side perspective view of the level with the arms of the level in the stowed position.
Figure 26:
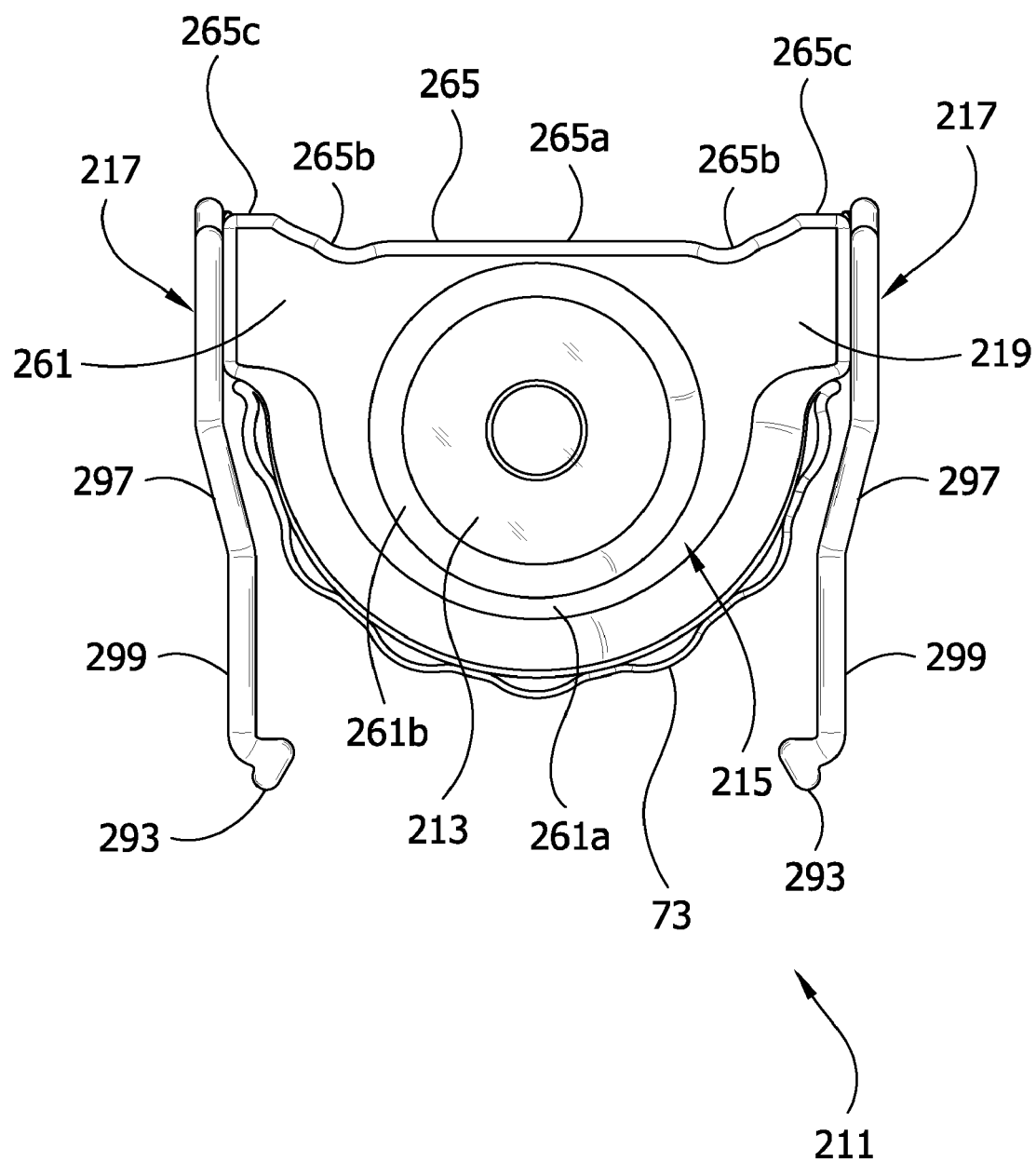
FIG. 26 is a top plan view thereof.

With reference to FIG. 21, this configuration of the level 111 also includes retainers 187 for holding the arms 117 against outward movement with respect to the sides 169 of the body 115. The retainers 187 are formed in upper and lower housing members 119, 121 of the body 115 and are disposed adjacent each of the body's sides 169. As in the previous configuration, the arms 117 include a stub shaft 177 and a tab 179 extending outwardly from the stub shaft. The retainers 187 are sized and shaped to engage opposite sides of the stub shaft 177 juxtaposed to the tab 179 to thereby capture the tab. The retainers 187 prevent the arms 117 from toggling with respect to the body 115 and provide the resistance necessary to maintain the nubs 185 of the arm 117 in the detents 181 on the sides 169 of the body when the arms are in either their operative position or their stowed position.

FIGS. 22-26 illustrate a third configuration of a level. The level of this configuration is indicated generally at 211, and is similar to the level 111 of the second configuration. Parts of this level corresponding to parts of the level 11 of the first configuration (FIGS. 1-15) are indicated by the same reference numbers, plus "200". In this configuration, connecting portions of each arm 217 are adapted for securing the level 211 to a survey rod SR' having a different construction (i.e., different surface configuration) than the survey rod shown in FIG. 1. More specifically, each arm 217 includes a first segment 295 that extents generally radially outward from the side of the body, a second segment 297 angled out of plane with the first segment, and a third generally straight segment 299. Fingers 293 extend outward from each of the third segments 299 to facilitate attaching the level to the survey rod. The third segments 299 are sized and shaped for face-to-face engagement with sides S' of the survey rod SR' when the level 211 is attached to the rod. Thus, the third configuration of the level is for attachment to a survey rod shaped differently than the first and second configurations of the level.

Having described the invention in detail, it will be apparent that modifications and variations are possible without departing from the scope of the invention defined in the appended claims.

When introducing elements of the present invention, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require and particular orientation of the item described.

As various changes could be made in the above level without departing from the scope of the invention, it is intended that all matter contained in the above description or shown in the accompanying drawings shall be interpreted as illustrative and not in a limiting sense.

What is claimed is:

1. A snap-on support for attachment to a geomatics target device, the support comprising:
    a body having at least two cavities; and
    a pair of spaced-apart arms adapted for snap-fit connection with the geomatics target device, each of the arms being connected to the body by a connector and moveable between an operative position in which the arms extend outward from the body for securing the support to the geomatics target device and a stowed position in which the arms are retracted generally adjacent to the body for storage of the support, each arm having a tab spaced from the connector for selective alignment with at least one of said cavities.

2. A support as set forth in claim 1 wherein said arms are pivotable between the operative and stowed positions.

3. A support as set forth in claim 2 wherein:
    each of the tabs extends laterally outward from the respective arm; and
    each cavity is adapted to capture the corresponding tab.

4. A support as set forth in claim 3 wherein the cavities comprise a first cavity pair disposed for capturing the tabs when the arms are in the operative position.

5. A support as set forth in claim 4 wherein the body includes a second cavity pair for capturing the when the arms are in the stowed position.

6. A support as set forth in claim 3 wherein the body comprises an upper housing member and a lower housing member attached to the upper housing member.

7. A support as set forth in claim 6 wherein the arms are captured between the upper and lower housing members.

8. A support as set forth in claim 7 further comprising a grip captured between the upper and lower housing members.

9. A support as set forth in claim 6 further comprising at least one fastener for securing the upper housing member and lower housing member together.

10. A support as set forth in claim 1 wherein the body includes an elastomeric grip.

11. A support as set forth in claim 10 wherein the grip includes a ribbed outwardly facing surface.

12. A support as set forth in claim 1 wherein the body includes an engagement surface for engaging the geomatics target device when the support is attached to the geomatics target device, the engagement surface being shaped to generally conform to the shape of the geomatics target device.

13. A support as set forth in claim 12 wherein the engagement surface has a generally flat central portion and angled portions flanking the central portion.

14. A support as set forth in claim 1 wherein each of the arms comprises an arcuate portion and a finger disposed outwardly from the arcuate portion.

15. A support as set forth in claim 1 further comprising a level vial, the body receiving the level vial therein.

16. A support as set forth in claim 1 wherein each arm includes a conformal portion shaped for conforming to a surface feature of the geomatics target device.

17. A support as set forth in claim 16 wherein the conformal portion of each arm is located between proximal and distal end portions of the arm.

18. A support as set forth in claim 17 wherein the conformal portion is generally arcuate.

19. A support as set forth in claim 17 wherein the distal end portion of each arm flares outwardly to define an inclined surface adapted to engage the geomatics target device.

20. A support as set forth in claim 1 in combination with the geomatics target device.

21. A combination set forth in claim 20 wherein the geomatics target device comprises a survey rod.

22. A combination set forth in claim 21 wherein the survey rod includes a front, a back, and two sides extending between the front and the back, the support being adapted to contact the two sides of the survey rod and at least one of the front and back of the survey rod.

23. A combination set forth in claim 22 wherein each of the sides of the survey rod includes a rib, and each of the arms of the support comprises an arcuate portion sized and shaped in conformance with a cross sectional shape of the rib for receiving the rib.

24. A level for a geomatics target device, the level comprising:
 a body having at least two cavities;
 a level vial secured to the body; and
 a pair of spaced-apart arms supported by the body and adapted for releasable, snap-fit connection with a geomatics target device, at least one of said arms being pivotable about an axis between a stowed position generally adjacent to the body and an extended position projecting outwardly from the body, each arm having an oval tab positioned in one of said body cavities for connecting the respective arm to the body.

25. A level as set forth in claim 24 wherein both arms are pivotable about the same axis.

* * * * *